(12) United States Patent
Fini et al.

(10) Patent No.: US 11,988,881 B2
(45) Date of Patent: May 21, 2024

(54) POLARIZATION DIVERSE RECEIVER WITH DELAYS

(71) Applicant: Ayar Labs, Inc., Santa Clara, CA (US)

(72) Inventors: John Fini, Albany, CA (US); Anatol Khilo, Lexington, MA (US); Chen Sun, Berkeley, CA (US); Pavan Bhargava, Berkeley, CA (US); Chandarasekaran Ramamurthy, Chandler, AZ (US)

(73) Assignee: Ayar Labs, Inc., Santa Clara, CA (US)

( * ) Notice: Subject to any disclaimer, the term of this patent is extended or adjusted under 35 U.S.C. 154(b) by 0 days.

(21) Appl. No.: 18/165,278

(22) Filed: Feb. 6, 2023

(65) Prior Publication Data

US 2023/0251440 A1 Aug. 10, 2023

Related U.S. Application Data

(60) Provisional application No. 63/307,588, filed on Feb. 7, 2022.

(51) Int. Cl.
*G02B 6/293* (2006.01)
*G02B 6/42* (2006.01)
*H04B 10/60* (2013.01)

(52) U.S. Cl.
CPC ....... *G02B 6/4215* (2013.01); *G02B 6/29335* (2013.01); *G02B 6/29338* (2013.01); *G02B 6/2938* (2013.01); *G02B 6/29395* (2013.01); *G02B 6/4213* (2013.01); *H04B 10/60* (2013.01); *G02B 6/29343* (2013.01)

(58) Field of Classification Search
CPC ............ G02B 6/29335; G02B 6/29338; G02B 6/29343; G02B 6/2938; G02B 6/29395; G02B 6/4213; G02B 6/4215; H04B 10/60
See application file for complete search history.

(56) References Cited

U.S. PATENT DOCUMENTS 6,895,161 B2 5/2005 Romo et al.
7,068,887 B1 6/2006 Gunn, III et al.
(Continued)

OTHER PUBLICATIONS

PCT Application No. PCT/US21/38550, International Search Report and Written Opinion, dated Oct. 4, 2021, 28 pages.
(Continued)

*Primary Examiner* — Ryan A Lepisto
(74) *Attorney, Agent, or Firm* — Penilla IP, APC

(57) ABSTRACT

A first portion of incoming light and a second portion of incoming light travel in opposite directions within a first optical waveguide. A ring resonator in-couples the first portion of incoming light and the second portion of incoming light from the first optical waveguide, such that the first portion of incoming light and the second portion of incoming light travel in opposite directions within the ring resonator. A second optical waveguide is disposed to in-couple the first portion of incoming light and the second portion of incoming light couple from the ring resonator, such that the first portion of incoming light and the second portion of incoming light travel in opposite directions within the second optical waveguide away from the ring resonator. One or more photodetector(s) are optically connected to receive the first portion of incoming light and the second portion of incoming light from the second optical waveguide.

21 Claims, 20 Drawing Sheets

(56) References Cited

U.S. PATENT DOCUMENTS

| | | | |
|---|---|---|---|
| 9,584,246 B2* | 2/2017 | Jeong | G02B 6/29397 |
| 9,615,152 B2 | 4/2017 | Jeong | |
| 10,225,018 B2 | 3/2019 | Witzens et al. | |
| 10,659,154 B2 | 5/2020 | Toda et al. | |
| 10,684,415 B1 | 6/2020 | Bulthuis et al. | |
| 10,841,012 B2 | 11/2020 | Wang et al. | |
| 11,172,275 B2 | 11/2021 | Testa et al. | |
| 2001/0053008 A1 | 12/2001 | Ueno | |
| 2003/0123780 A1 | 7/2003 | Fischer | |
| 2008/0123188 A1 | 5/2008 | Klein et al. | |
| 2014/0153931 A1 | 6/2014 | Doerr | |
| 2014/0217269 A1* | 8/2014 | Guo | G01D 5/35322 385/11 |
| 2015/0381301 A1 | 12/2015 | Jeong | |
| 2018/0062761 A1 | 3/2018 | Wade et al. | |
| 2018/0375583 A1 | 12/2018 | Wang et al. | |
| 2019/0179163 A1 | 6/2019 | Baehr-Jones et al. | |
| 2019/0207682 A1 | 7/2019 | Wen et al. | |
| 2021/0405308 A1 | 12/2021 | Bhargava et al. | |

OTHER PUBLICATIONS

Madsen C.K. et al., "Reset-Free Integrated Polarization Controller Using Phase Shifters," IEEE Journal of Selected Topics in Quantum Electronics, vol. 11, No. 2, Mar./Apr. 2005, 8 pages.

Sun, C. et al., "Single-Chip Microprocessor that Communicates Directly Using Light," Nature, vol. 528, Dec. 2015, 5 pages (pp. 534-538).

PCT Application No. PCT/US23/12442, International Search Report and Written Opinion, dated Jul. 7, 2023, 12 pages.

Nojic, Jovana et al., "Polarization-Diverse Silicon Photonics WDM Receiver with a Reduced Number of OADMs and Balanced Group Delays," Optical Fiber Communication Conference (OFC) 2020, OSA Technical Digest, Optica Publishing Group, Mar. 8, 2020, paper M4H.2, 3 pages.

Park, Anthony H. K. et al., "Ring Resonator Based Polarization Diversity WDM Receiver," Optics Express, vol. 27, No. 5, Mar. 4, 2019, 11 pages.

* cited by examiner (View A-A)

(View B-B)

(View A-A)

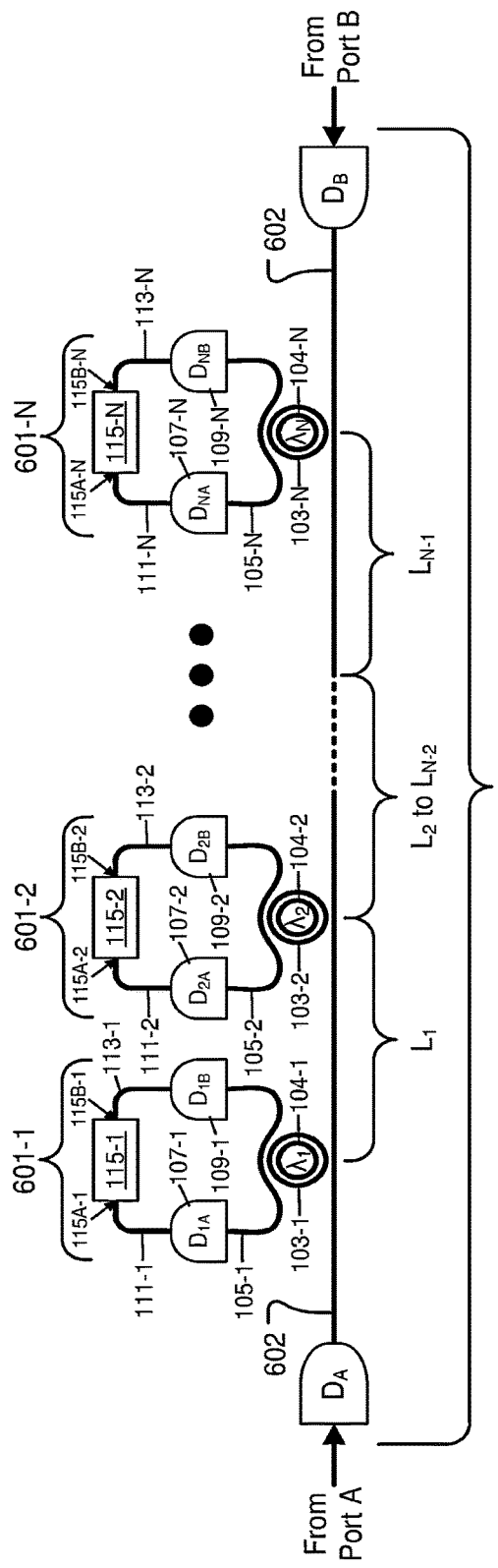
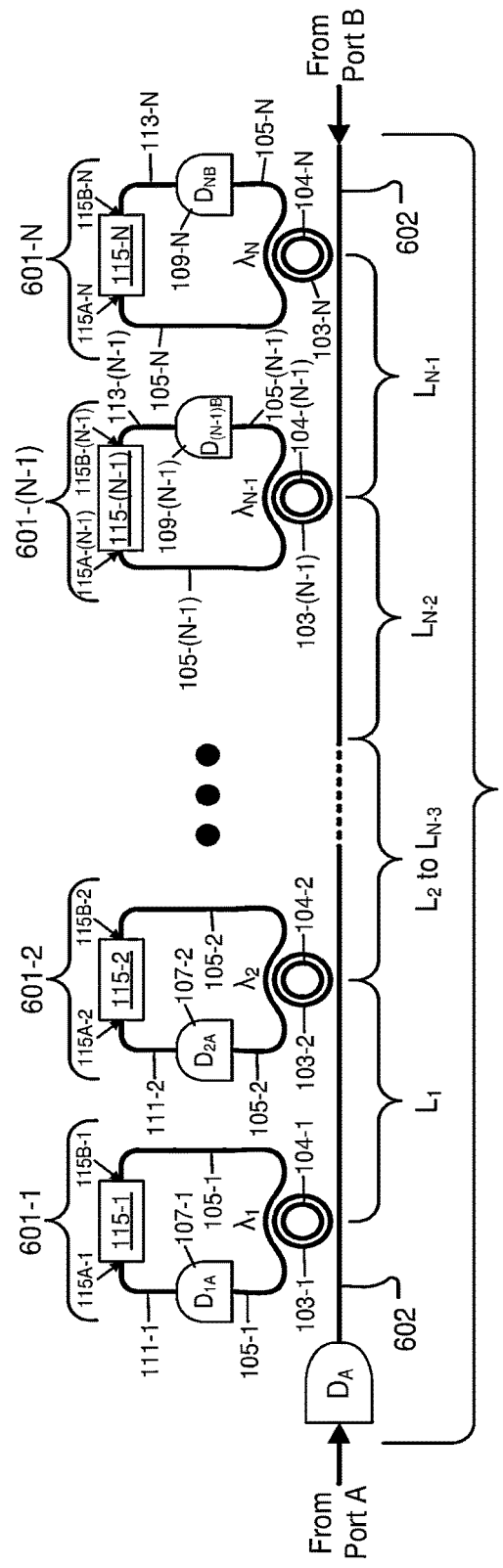
Fig. 6
Fig. 7

WDM Receiver Row
Circuit Unit Cell
Floorplan

WDM Receiver Row
Reflected Circuit Unit Cell
Floorplan

POLARIZATION DIVERSE RECEIVER WITH DELAYS

CROSS-REFERENCE TO RELATED APPLICATIONS

This application claims priority under 35 U.S.C. 119(e) to U.S. Provisional Patent Application No. 63/307,588, filed on Feb. 7, 2022, the disclosure of which is incorporated herein by reference in its entirety for all purposes.

BACKGROUND OF THE INVENTION

1. Field of the Invention

The disclosed embodiments relate to optical data communication.

2. Description of the Related Art

Optical data communication systems operate by modulating laser light to encode digital data patterns. The modulated laser light is transmitted through an optical data network from a sending node to a receiving node. The modulated laser light having arrived at the receiving node is de-modulated to obtain the original digital data patterns. Therefore, implementation and operation of optical data communication systems is dependent upon having reliable and efficient devices for conveying optical signals, coupling optical signals between optical waveguides, modulating optical signals, and receiving optical signals. It is within this context that the disclosed embodiments arise.

SUMMARY OF THE INVENTION

In an example embodiment, an electro-optic receiver is disclosed. The electro-optic receiver includes a first optical waveguide optically connected to convey a first portion of incoming light in a first direction through the first optical waveguide. The first optical waveguide is also optically connected to convey a second portion of incoming light in a second direction through the first optical waveguide. The second direction is opposite of the first direction. The electro-optic receiver also includes a ring resonator disposed within an evanescent optical coupling distance of the first optical waveguide, such that the first portion of incoming light and the second portion of incoming light couple into the ring resonator from the first optical waveguide, and such that the first portion of incoming light and the second portion of incoming light travel in opposite directions within the ring resonator. The electro-optic receiver also includes a second optical waveguide disposed within an evanescent optically coupling distance of the ring resonator, such that the first portion of incoming light and the second portion of incoming light couple into the second optical waveguide from the ring resonator, and such that the first portion of incoming light and the second portion of incoming light travel in opposite directions within the second optical waveguide away from the ring resonator. The electro-optic receiver also includes a photodetector that is optically connected to both a first end of the second optical waveguide and a second end of the second optical waveguide.

In an example embodiment, an electro-optic receiver is disclosed. The electro-optic receiver includes an optical waveguide that has a first end and a second end. The electro-optic receiver also includes a plurality of wavelength division multiplexing (WDM) demultiplexers disposed along the optical waveguide. Each WDM demultiplexer of the plurality of WDM demultiplexers is configured to in-couple optical signals of a respective one of a plurality of wavelengths that travel through the optical waveguide in a first direction as first in-coupled optical signals. Each WDM demultiplexer of the plurality of WDM demultiplexers is also configured to in-couple optical signals of the respective one of the plurality of wavelengths that travel through the optical waveguide in a second direction as second in-coupled optical signals. The second direction is opposite of the first direction. Each WDM demultiplexer of the plurality of WDM demultiplexers is also configured to direct the first in-coupled optical signals to a first photodetector and to direct the second in-coupled optical signals to a second photodetector.

Other aspects and advantages of the disclosed embodiments will become more apparent from the following detailed description, taken in conjunction with the accompanying drawings, illustrating by way of example the disclosed embodiments.

BRIEF DESCRIPTION OF THE DRAWINGS

FIG. 6 shows an example WDM receiver row, in accordance with some embodiments.

FIG. 7 shows an example WDM receiver row, in accordance with some embodiments.

DETAILED DESCRIPTION OF THE INVENTION

Figure 1A:
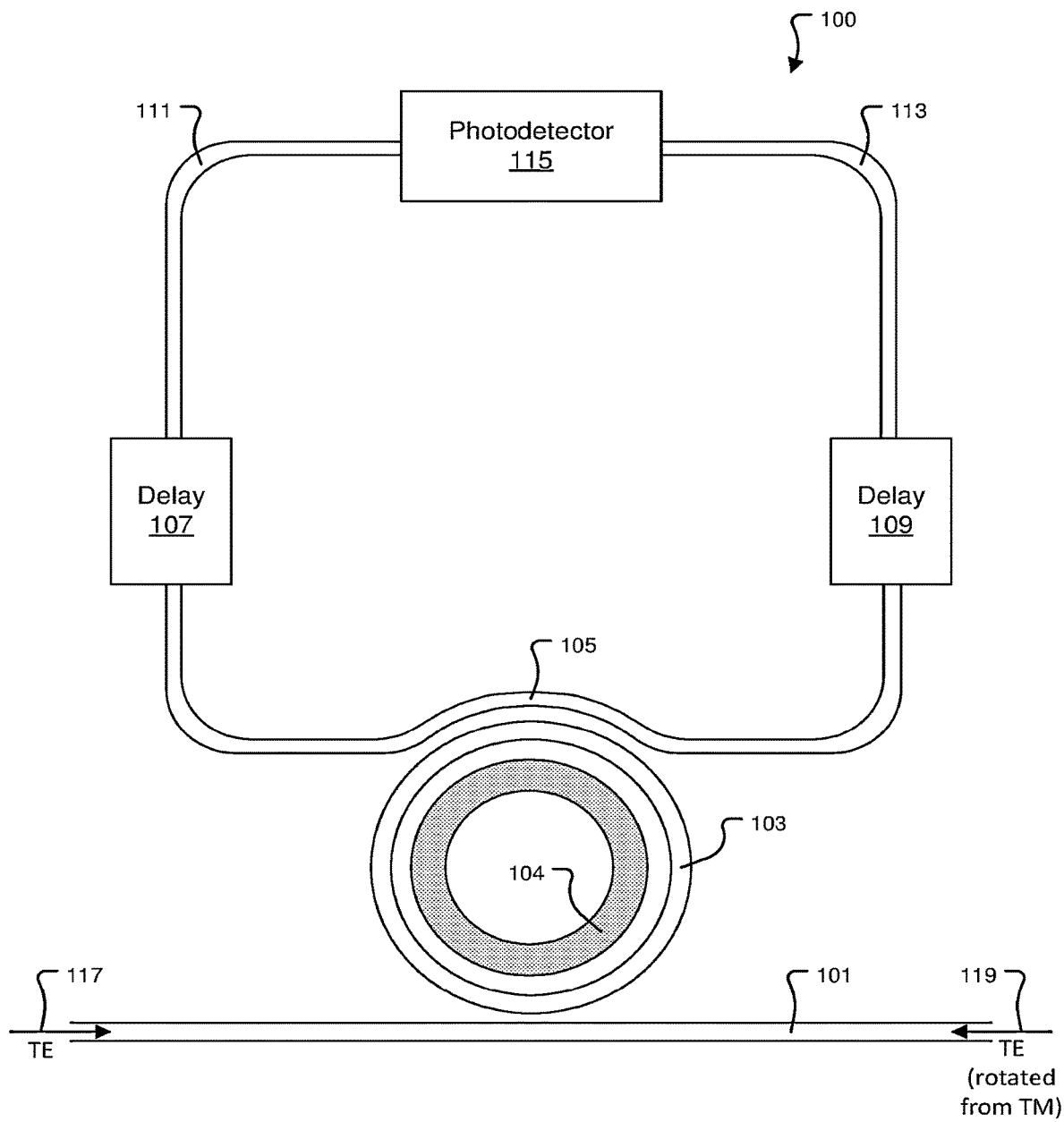
FIG. 1A shows a portion of an optical receiver row in a wavelength-division multiplexed electro-optic receiver that includes a wavelength division multiplexing (WDM) demultiplexer, in accordance with some embodiments.

In the following description, numerous specific details are set forth in order to provide an understanding of the disclosed embodiments. It will be apparent, however, to one skilled in the art that the disclosed embodiments may be practiced without some or all of these specific details. In other instances, well known process operations have not been described in detail in order not to unnecessarily obscure the disclosed embodiments.

Integrating photonic components on a semiconductor chip has many advantages. However, integrated photonic components are often highly polarization sensitive, while standard single-mode optical fibers that are used for conveying digital data as modulated light signals to and/or from the integrated photonic components is often not polarization maintaining. In optical data communication systems, it is common for modulated light signals that convey digital data to arrive on an optical fiber at a photonic receiver device in an unknown and uncontrolled mixture of polarization components. In these situations, it is a challenge for the photonic receiver device to process the incoming modulated light signals effectively with polarization-sensitive integrated photonic components. It is within this context that the present invention arises.

Optical data communication systems operate by modulating laser light to encode digital data patterns within the electrical domain as modulated light signals within the optical domain. The modulated light signals are transmitted through optical fibers to an electro-optic receiver where the modulated light signals are detected and decoded to obtain the original encoded digital data patterns back in the electrical domain. In many optical data communication systems, a polarization state of the light within the optical fiber is not controlled, and may be perturbed by small movements of the optical fiber and/or changes in ambient temperature while the system is operating. In these systems, the electro-optic receiver has to handle incoming light signals that have an arbitrary polarization that varies over time.

Electro-optic receiver systems have been built into photonic integrated circuits (PIC's), enabling compact and high-performance detection of modulated light signals received as input from optical fibers. Optical coupling of light from an optical fiber into a PIC requires an optical coupling configuration that can accept input light from either polarization (transverse electric (TE) or transverse magnetic (TM)) of an optical fiber and output it to one or more optical waveguides on the PIC, and often into a preferred polarization state. In some embodiments disclosed herein, an optical coupling configuration is provided in which incoming light is received through either a dual-polarization vertical grating coupler or an edge coupler and is conveyed into a PIC polarization splitter, which splits the incoming light from the two input optical fiber polarizations (TE and TM) and outputs the incoming light of a first polarization and a second polarization into two separate optical waveguides on the PIC, respectively. Also, in some embodiments, either the first polarization or the second polarization is rotated to the other polarization in route to the two separate optical waveguides on the PIC, such that light having the same polarization is conveyed into each of the two separate optical waveguides on the PIC. In some implementations, a significant advantage is gained by using optical devices that can efficiently detect optical signals that are split in this way based on polarization. Also, in some implementations, there are further advantages obtained by using one photodiode (such as in a photodetector) for both polarization mode components of the incoming light rather than duplicating the number of photodiodes to provide for separate detection of the two polarization mode components of the incoming light, where such further advantages include decreased complexity of the optical circuitry, reduced detector capacitance per channel, and reduced dark current, which results in increased photodiode/photodetector sensitivity.

Various embodiments are disclosed herein for an electro-optic receiver. The electro-optic receiver enables the detection of optical signals of arbitrary input polarization with a single photodetector or set of photodetectors. The electro-optic receiver includes an input optical fiber carrying incoming light (modulated light) with arbitrary (uncontrolled) polarization that conveys a signal that is decodable to a digital data pattern. The electro-optic receiver also includes an optical coupling device that transfers the incoming light from the input fiber to a PIC. The electro-optic receiver also includes a polarization beam splitter that receives an arbitrary input polarization state and splits it into two separate optical waveguides of the PIC, where each of the two separate optical waveguides contains one of the orthogonal components of the input polarization state of the incoming light, possibly converted into a different polarization state. In some embodiments of the electro-optic receiver, the functionality of the polarization beam splitter is combined with the optical coupling device in the form of a dual-polarization grating coupler. In some embodiments of the electro-optic receiver, the two optical waveguides of the PIC support a single polarization mode that is well isolated in propagation constant from other spatial modes, including the other polarization state, making it operationally single-mode, single-polarization. The electro-optic receiver also includes an optical routing system in which the two optical waveguides of the PIC are routed to the same photodetector or set of photodetectors. In some embodiments, the electro-optic receiver also includes a timing-skew management system that corrects for degradation in the signal arising from time delay mismatch between the two optical waveguides of the PIC and the photodetector or set of photodetectors.

The electro-optic receiver disclosed herein is particularly useful in applications where electro-optic receivers implemented within a PIC detect light from an input optical fiber in which the polarization is not controlled. The electro-optic receiver is especially advantageous in applications that encode multiple data channels on the input optical fiber on different wavelengths, for example using wavelength division multiplexing (WDM), and in cases where polarization-diversity WDM electro-optic receiver architectures have a timing-skew. This timing-skew may vary from one channel to the next, typically in a known way. Some existing electro-optic receivers that are capable of handling uncontrolled input polarization require two separate electro-optic receivers, one for each orthogonal polarization state, together with extensive digital signal processing to combine the signals. It should be appreciated that the electro-optic receiver embodiments disclosed herein provide a single, compact, and power-efficient electro-optic receiver to combine and detect signals from the two polarization states of any wavelength channel. In some embodiments disclosed herein, a bidirectional polarization diverse electro-optic receiver system is provided in which a WDM receiver row includes multiple WDM demultiplexers, with each WDM demultiplexer configured to in-couple optical signals propagating along a common optical bus in either direction and direct the in-coupled optical signals to either the same photodetector or to a pair of matched photodetectors.

Some embodiments of the electro-optic receiver disclosed herein are particularly useful in situations in which the polarization states of the incoming light of the different wavelength channels are roughly the same from one wavelength channel to the next, and where the polarization states of the incoming light of the different wavelength channels are unknown. Some embodiments of the electro-optic receiver disclosed herein are particularly useful in situations in which the polarization state of the incoming light of a given wavelength channel is unknown, and where the polarization state of the incoming light of the given wavelength channel varies in a slow and controlled manner (such as monotonically) as compared to other wavelength channels of the incoming light. For example, these situations may occur when the WDM signal wavelength channels all originate at the same source, traverse the same optical fiber, and are received together, as is the case in a WDM point-to-point link. Some embodiments of the electro-optic receiver disclosed herein are useful in a more generalized situation in which each wavelength channel of the incoming light has a completely different unknown polarization, and where the polarization states of the different wavelength channels of the incoming light are uncorrelated. For example, these situations may occur when different WDM channels originate in different locations and may not share the same optical fiber(s) over the entire propagation path from the respective sources of the incoming light to the electro-optic receiver. The electro-optic receiver embodiments disclosed herein are configured to handle incoming light signals whose polarization state is unknown and is either static in time or dynamically changing in time. Various embodiments of the electro-optic receiver disclosed herein provide for reception of incoming light signals having unknown polarization states, even if the polarization states change at high speeds, e.g., into the gigaHertz (GHz) regime, but more typically in the kiloHertz (kHz) (or millisecond) regime or even slower.

Various embodiments are disclosed herein for an electro-optic receiver that includes placement of optical signal timing delay sections having respective prescribed optical signal timing delay magnitudes (optical waveguide lengths) that provide for effective timing differential compensation for different polarization components (TE and TM) within input optical signals (modulated light signals) received at the electro-optic receiver. The placements and configurations of the various optical signal timing delay sections are defined to minimize impact on the chip floorplan for the overall larger electro-optic receiver system. In some embodiments, a polarization-diverse electro-optic receiver is disclosed in which the polarization components (TE and TM) of the input optical signals (the modulated light signals) received at the electro-optic receiver are fed into an optical receiver row in opposite directions, respectively, with the optical signal timing of the two polarization components being equalized by placement of one or more optical signal timing delay sections of respectively prescribed optical signal timing delay magnitude (optical waveguide length) along the optical receiver row. The placement and optical signal timing delay magnitude (optical waveguide length) of the various optical signal timing delay sections provide for low optical signal delay impairment, low optical signal waveguide loss, and chip layout benefits.

FIG. 1A shows a portion of an optical receiver row in a wavelength-division multiplexed electro-optic receiver that includes a WDM demultiplexer 100, in accordance with some embodiments. In some embodiments, the WDM demultiplexer 100 is disposed in a single-polarization WDM receiver row, given that the TM polarization of the incoming light signal is rotated to TE polarization, such as by a polarization splitter and rotator (PSR). In some embodiments, the portion of the optical receiver row that includes the WDM demultiplexer 100 is implemented in a PIC. The portion of the optical receiver row 100 includes an optical waveguide 101. The WDM demultiplexer 100 includes a ring resonator 103 and an optical waveguide 105 configured to extend past the ring resonator 103. The optical waveguide 105 is positioned within an evanescent optical coupling distance of the ring resonator 103, so that light traveling through the ring resonator 103 will evanescently optically couple into the optical waveguide 105. The optical waveguide 105 has a first end optically connected to an input of a first optical signal timing delay section 107. The optical waveguide 105 has a second end optically connected to an input of a second optical signal timing delay section 109. In some embodiments, each of the first optical signal timing delay section 107 and the second optical signal timing delay section 109 is configured as a respectively prescribed length of optical waveguide. The first optical signal timing delay section 107 has an output optically connected to a first end of an optical waveguide 111. Similarly, the second optical signal timing delay section 109 has an output optically connected to a first end of an optical waveguide 113. The optical waveguide 111 has a second end optically connected to a first input of a photodetector 115. Similarly, the optical waveguide 113 has a second end optically connected to a second input of the photodetector 115. In some embodiments, the photodetector is implemented as a pair of matched photodetectors, with an optical input of a first photodetector in the pair of matched photodetectors optically connected the second end of the optical waveguide 111, and with an optical input of a second photodetector in the pair of matched photodetectors optically connected the second end of the optical waveguide 113.

In some embodiments, the optical waveguide 111 and the optical waveguide 105 are integrally formed as the same optical waveguide that extends through the first optical signal timing delay section 107. In these embodiments, the optical waveguide 105 extends through the first optical signal timing delay section 107, such that a first end of the optical waveguide 105 is connected to the first input of the photodetector 115. Also, in some embodiments, the optical waveguide 113 and the optical waveguide 105 are integrally formed as the same optical waveguide that extends through the second optical signal timing delay section 109. In these embodiments, the optical waveguide 105 extends through the second optical signal timing delay section 109, such that a second end of the optical waveguide 105 is connected to the second input of the photodetector 115.

Each of the optical waveguides 101, 105, 111, 113 and the ring resonator 103 is formed of a material through which light can be in-coupled, out-coupled, and guided. Each of the optical waveguides 101, 105, 111, 113 and the ring resonator 103 has an index of refraction sufficiently different from that of a surrounding material to enable guiding of light through the waveguides 101, 105, 111, 113 and the ring resonator 103. In some embodiments, the optical waveguides 105, 111, 113 and the optical signal timing delay sections 107 and 109 are formed as respective parts of the same contiguous optical waveguide structure. In some other embodiments, one or more of the optical waveguides 105, 111, 113, and the optical signal timing delay sections 107 and 109 is/are formed as separate optical waveguide structure(s) that are optically coupled to other(s) of the optical waveguides 105, 111, 113 and the optical signal timing delay sections 107 and 109, as shown in FIG. 1A.

In some embodiments, the optical receiver row that includes the WDM demultiplexer 100 receives incoming light from an optical fiber, such as from a single-mode optical fiber that is not polarization maintaining. In some embodiments, the incoming light is modulated light that conveys a digital bit pattern. The incoming light is not polarization-controlled when it arrives at the electro-optic receiver through the optical fiber. Therefore, the polarization of the incoming light received from the optical fiber is unknown when it arrives at the electro-optic receiver. In some embodiments, the electro-optic receiver includes an optical coupler configured to receive the incoming light from the optical fiber and direct the incoming light into the optical waveguide 101 of the optical receiver row that includes the WDM demultiplexer 100. In some embodiments, the optical coupler is configured as a dual-polarization grating coupler (either as an edge grating coupler or as a vertical grating coupler) that splits the two polarizations (TE and TM) of incoming light. In some embodiments, the dual-polarization grating coupler is configured to direct a first portion of the incoming light having a first polarization (either TE or TM) into a first end of the optical waveguide 101. The dual-polarization grating coupler is also configured to rotate a polarization of a second portion of the incoming light from a second polarization that is opposite of the first polarization (e.g., the second polarization is TM, if the first polarization is TE, and vice-versa) to the first polarization so as to provide a polarization-rotated second portion of the incoming light that has the first polarization. The dual-polarization grating coupler is configured to direct the polarization-rotated second portion of the incoming light into a second end of the optical waveguide 101.

The optical waveguide 101 is configured to extend in a continuous, loop-like configuration from its first end to its second end. In this manner, the first portion of the incoming light having the first polarization travels in a first light propagation direction through the optical waveguide 101 as indicated by arrow 117, and the polarization-rotated second portion of the incoming light (also having the first polarization) travels in a second light propagation direction through the optical waveguide 101 that is opposite of the first light propagation direction, as indicated by arrow 119. Therefore, the first portion of the incoming light (e.g., TE polarization) and the polarization-rotated second portion of the incoming light (e.g., TM polarization rotated to TE polarization) travel in opposite light propagation directions through the optical waveguide 101.

The ring resonator 103 is positioned alongside the optical waveguide 101 and within the evanescent optical coupling distance of the optical waveguide 101. The ring resonator 103 is configured to operate at a particular resonant wavelength. In some embodiments, the particular resonant wavelength at which the ring resonator 103 operates is a narrow wavelength range. For ease of description, any ring resonator (e.g., 103) disclosed herein is described as operating a particular resonant wavelength, with the understanding that the particular resonant wavelength is actually a narrow wavelength range that is distinguishable from other different resonant wavelength ranges. In this manner, a given ring resonator (e.g., 103) is configured to evanescently couple light at the particular resonant wavelength (within the narrow wavelength range about the particular resonant wavelength). In some embodiments, a heater 104 is implemented to thermally tune the resonant wavelength of the ring resonator 103. In some embodiments, the heater 104 is a resistance heating device that converts electrical current into thermal energy. In these embodiments, the heater 104 is controlled by a control circuit. In some embodiments, the control circuit is connected to receive a feedback signal from the photodetector 115, where the feedback signal indicates an amount of light detected by the photodetector 115. The feedback signal is used by the control circuit to control the heater 104 to optimize the resonant wavelength of the ring resonator 103, so as to maximize the amount of light conveyed to and detected by the photodetector 115.

In some embodiments, the ring resonator 103 is implemented as an annular-shaped waveguide having circuitous configuration, e.g., circular, oval, race-track, or another arbitrary circuitous shape. In some embodiments, the ring resonator 103 is configured to have an annular-shape or disc-shape with an outer diameter of less than about 50 micrometers. In some embodiments, the ring resonator 103 is configured to have an annular-shape or disc-shape with an outer diameter of less than about 10 micrometers.

Figure 1B:
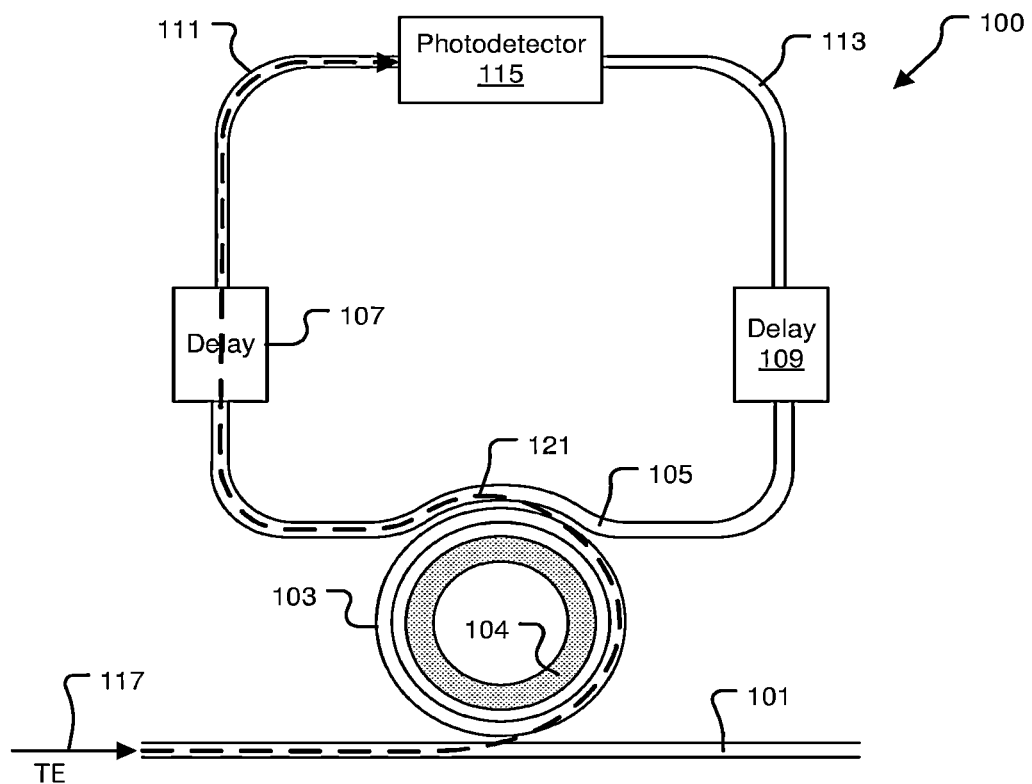
FIG. 1B shows how the first portion of the incoming light (e.g., TE polarization) propagates along a path (represented by the heavy dashed line) through the portion of the optical receiver row and through the WDM demultiplexer as shown in FIG. 1A, in accordance with some embodiments.
Figure 1C:
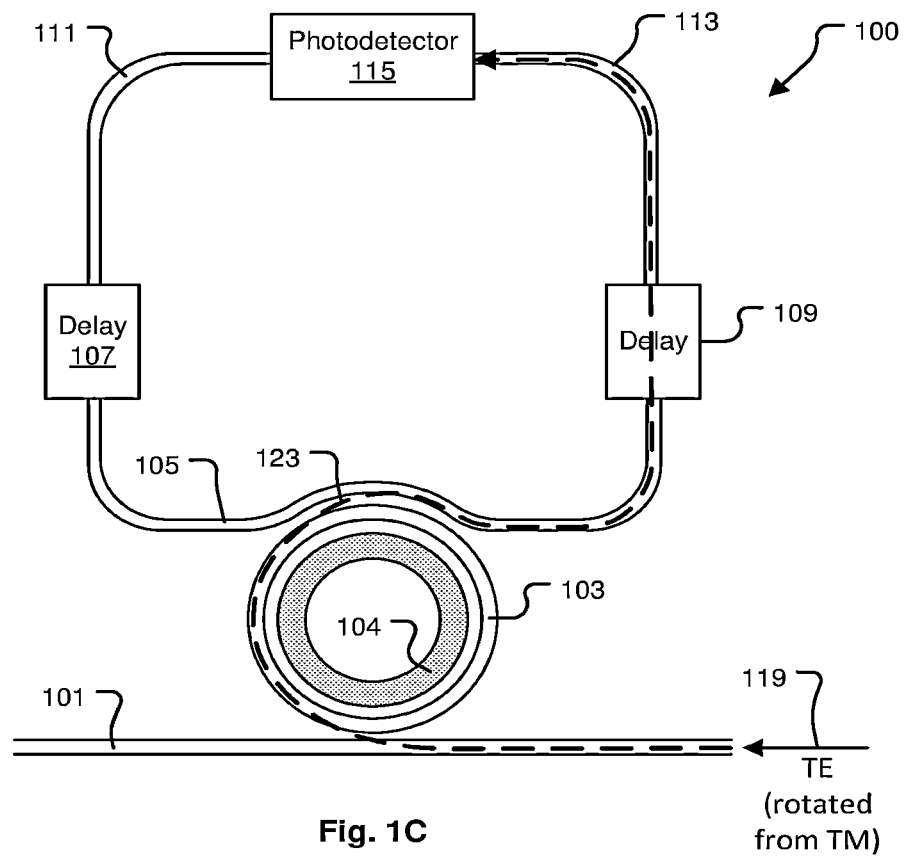
FIG. 1C shows how the second portion of the incoming light (e.g., TE polarization rotated from TM polarization) propagates along a path (represented by the heavy dashed line) through the portion of the optical receiver row and through the WDM demultiplexer as shown in FIG. 1A, in accordance with some embodiments.

FIG. 1B shows how the first portion of the incoming light (e.g., TE polarization) propagates along a path 121 (represented by the heavy dashed line) through the portion of the optical receiver row and through the WDM demultiplexer 100 as shown in FIG. 1A, in accordance with some embodiments. FIG. 1C shows how the second portion of the incoming light (e.g., TE polarization rotated from TM polarization) propagates along a path 123 (represented by the heavy dashed line) through the portion of the optical receiver row and through the WDM demultiplexer 100 as shown in FIG. 1A, in accordance with some embodiments. The ring resonator 103 is configured and controlled to operate at a particular resonant wavelength, such that the first portion of the incoming light having a wavelength substantially equal to the particular resonant wavelength optically couples into the ring resonator 103 in a first propagation direction (counter-clockwise direction), and such that the polarization-rotated second portion of the incoming light having a wavelength substantially equal to the particular resonant wavelength optically couples into the ring resonator 103 in a second propagation direction (clockwise) that is opposite the first propagation direction. It should be understood that both the first portion of the incoming light and the polarization-rotated second portion of the incoming light have the same polarization state within the optical waveguide 101, the ring resonator 103, the optical waveguides 105, 111, 113, and the optical signal timing delay sections 107 and 109. Therefore, the ring resonator 103 operating at a particular resonant wavelength is able to optically in-couple and detect both the first portion of the incoming light and the polarization-rotated second portion of the incoming light having the particular resonant wavelength.

Because of imbalance of optical routing and different delays for TE and TM polarizations in a PSR and optical components preceding the PSR (e.g., waveguides, fiber couplers, etc.), the first portion of the incoming light (indicated by arrow 117) and the corresponding polarization-rotated second portion of the incoming light (indicated by arrow 119) may not arrive at the ring resonator 103 at the same time. One or both of the first optical signal timing delay section 107 and the second optical signal timing delay section 109 is provided to compensate for the temporal difference in arrival time of the first portion of the incoming light and the corresponding polarization-rotated second portion of the incoming light at the ring resonator 103, such that the first portion of the incoming light and the corresponding polarization-rotated second portion of the incoming light arrives at the photodetector 115 at substantially the same time to provide for recovery of the optical signal as conveyed within the incoming light. In some embodiments, the difference in arrival time of the first portion of the incoming light and the corresponding polarization-rotated second portion of the incoming light at the ring resonator 103 can be caused by differences in optical path length through the optical waveguide 101 to the ring resonator 103 and/or by delay in outputting the polarization-rotated second portion of the incoming light relative to the first portion of the incoming light from the polarization splitter rotator (PSR) and/or optical coupler (e.g., from the dual-polarization grating coupler). It should be understood that the "incoming light" is the light in the optical fiber, rather than light at the input or output of the PSR. In some embodiments, on the way to the PSR, light propagates through a fiber-to-chip coupler and some section of waveguide as TE and TM light. Because propagation velocities for TE and TM light on chip are different, there will be temporal delay between the two polarizations (TE and TM) at the input of the PSR. The systems and methods disclosed herein serve at least in part to compensate for the temporal delay between the two polarizations (TE and TM) through implementation of appropriately configured optical delay lines.

The first optical signal timing delay section 107 and the second optical signal timing delay section 109 are respectively defined to equalize delays in conveying the first portion of the incoming light and the corresponding polarization-rotated second portion of the incoming light to the photodetector 115. In some embodiments, the first optical signal timing delay section 107 and/or the second optical signal timing delay section 109 is configured to provide additional optical waveguide length beyond a minimum amount of optical waveguide length that is needed for routing of light from the ring resonator 103 to the photodetector 115.

Figure 1D:
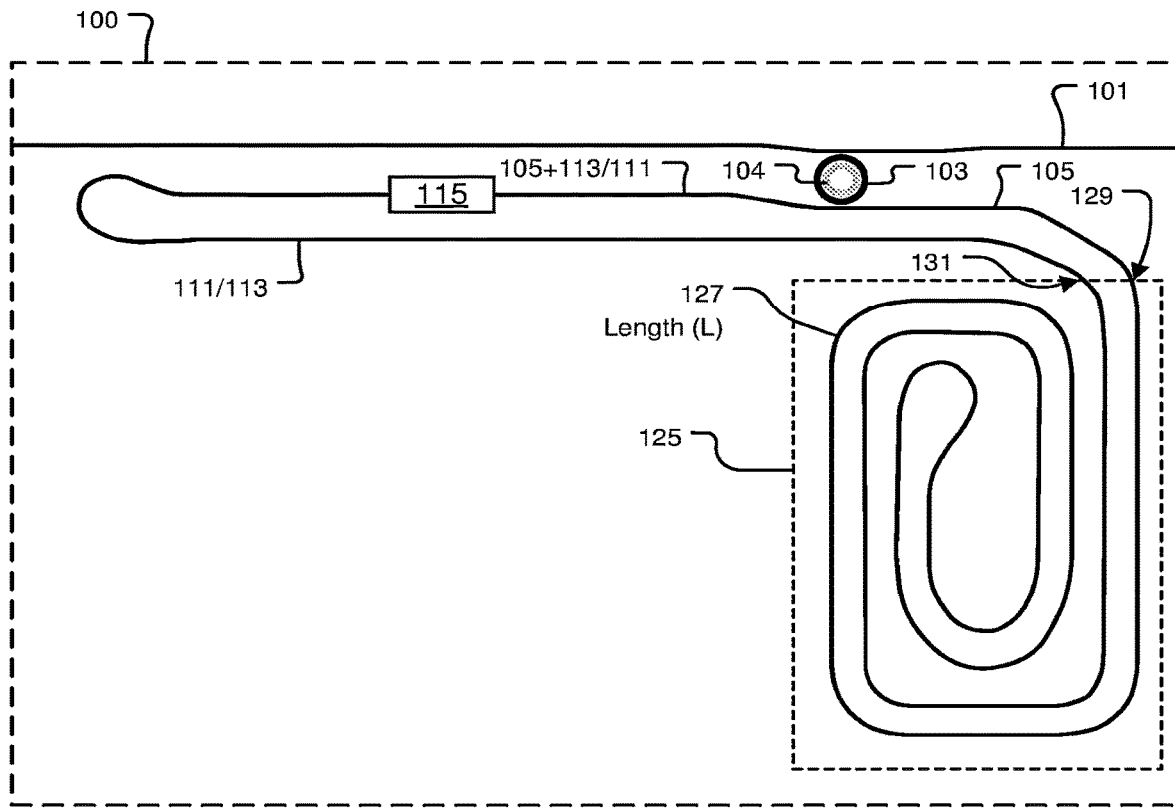
FIG. 1D shows an example of an optical signal timing delay section, in accordance with some embodiments.

FIG. 1D shows an example of an optical signal timing delay section 125, in accordance with some embodiments. In some embodiments, one or both of the first optical signal timing delay section 107 and the second optical signal timing delay section 109 can be implemented in a similar manner as the example optical signal timing delay section 125. In some embodiments, the optical signal timing delay section 125 is configured as a length L of optical waveguide 127. In some embodiments, the length L of the optical waveguide 127 within the optical signal timing delay section 125 is defined to provide a specified amount of temporal delay in propagation of light, where the temporal delay is defined by the amount of time it takes for light to travel from an input 129 of the optical signal timing delay section 125 to an output 131 of the optical signal timing delay section 125. The length L of the optical waveguide 127 within the optical signal timing delay section 125 and the corresponding temporal delay in propagation of light are related through a group velocity ($V_g$) of the light traveling through the optical signal timing delay section 125. For example, the length L of the optical waveguide 127 within the optical signal timing delay section 125 contributes a temporal delay in propagation of light equal to about ($L/V_g$). The group velocity ($V_g$) of the light depends on multiple factors, including a type of the optical waveguide 127, a width of the optical waveguide 127, a wavelength of the propagating light, and a polarization of the propagating light, among other parameters. In some embodiments, the length L of the optical waveguide 127 within the optical signal timing delay section 125 is formed in one or more of a folded manner, a convoluted manner, a spiral manner, a loop manner, and a zig-zag manner, among others, to give the optical signal timing delay section 125 a compact footprint within the PIC.

Figure 1E:
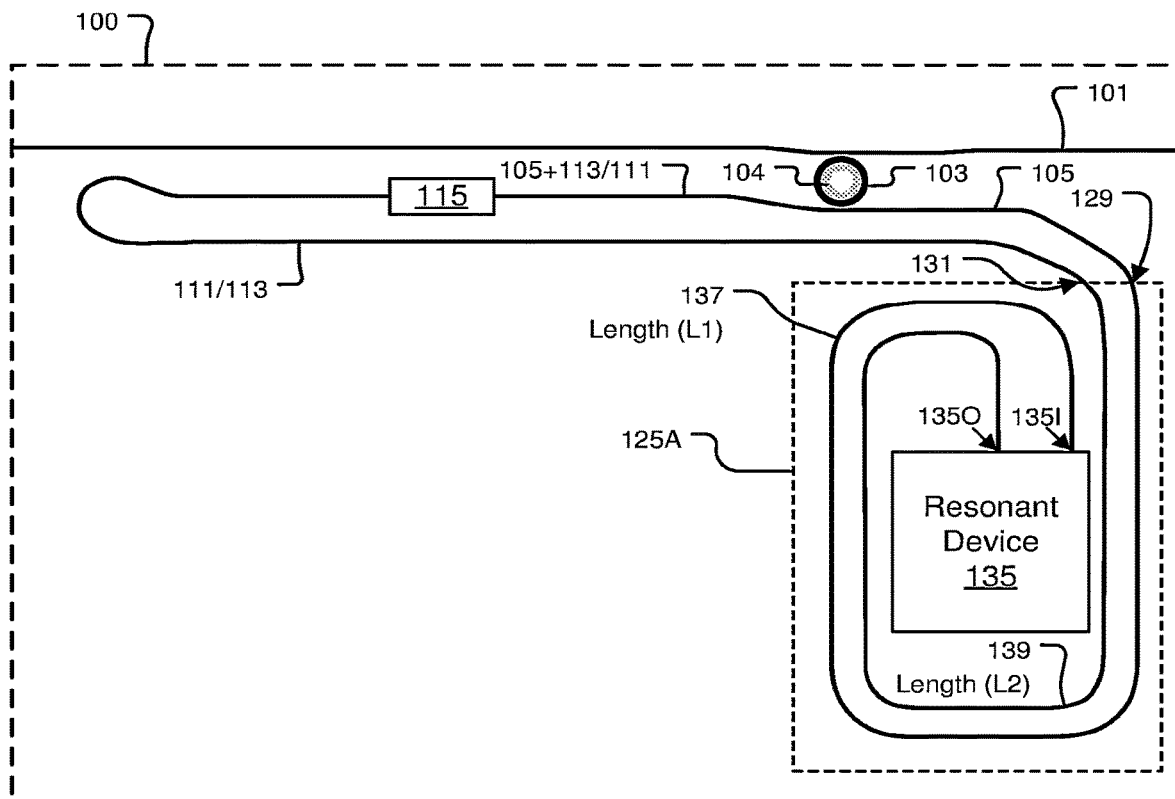
FIG. 1E shows an optical signal timing delay section that incorporates a resonant device, in accordance with some embodiments.

It should be understood that in various embodiments, either in addition to or in lieu of a length of optical waveguide (e.g., the length L of the optical waveguide 127 within the optical signal timing delay section 125), one or both of the first optical signal timing delay section 107 and the second optical signal timing delay section 109 can be implemented to include a variety of other photonic devices, such as resonant devices, e.g., all-pass ring resonator filters, slow-light structures, and/or other photonic device(s) that impart a temporal delay in light signal propagation. For example, FIG. 1E shows an optical signal timing delay section 125A that incorporates a resonant device 135, in accordance with some embodiments. The optical signal timing delay section 125A is a variation of the optical signal timing delay section 125 of FIG. 1D. The timing delay section 125A includes an input optical waveguide section 137 having a first length $L_1$ that extends from the input 129 of the optical signal timing delay section 125A to an input 1351 of the resonant device 135. The timing delay section 125A also includes an output optical waveguide section 139 having a second length $L_2$ that extends from an output 1350 of the resonant device 135 to the output 131 of the optical signal timing delay section 125A. The optical delay provided by the timing delay section 125A is a sum of the optical delays of the input optical waveguide section 137, the output optical waveguide section 139, and the resonant device 135.

Figure 1F:
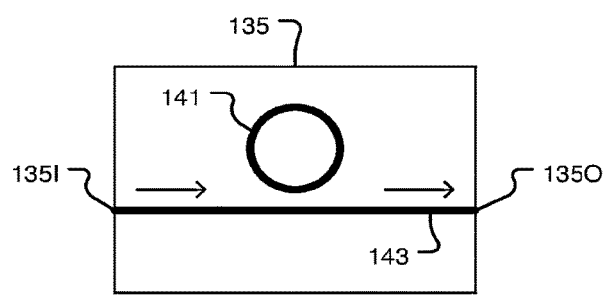
FIG. 1F shows an example implementation of the resonant device as a single ring resonator with a through-port output, in accordance with some embodiments.
Figure 1G:
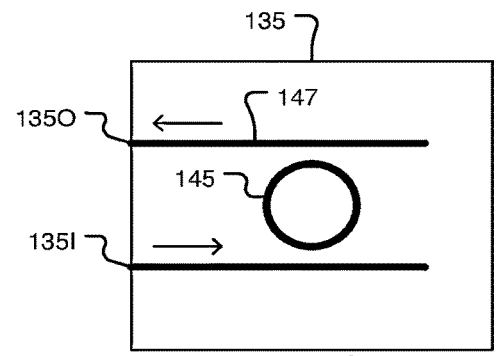
FIG. 1G shows another example implementation of the resonant device as a single ring resonator with a drop-port output, in accordance with some embodiments.
Figure 1H:
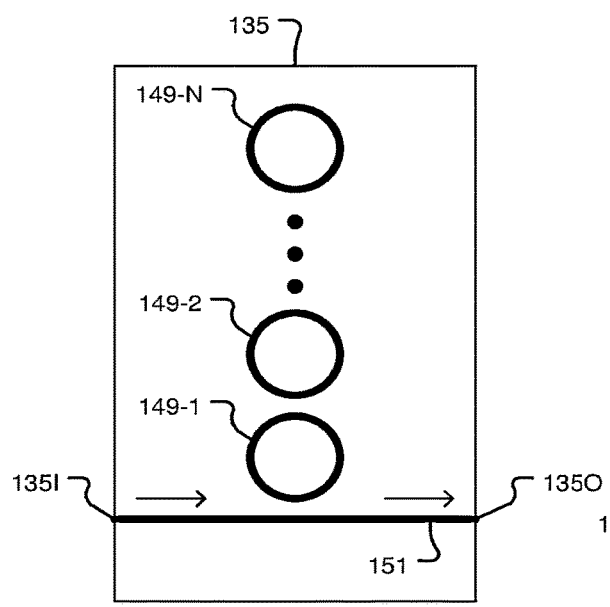
FIG. 1H shows an example implementation of the resonant device that includes multiple coupled ring resonators with a through-port output, in accordance with some embodiments.
Figure 1I:
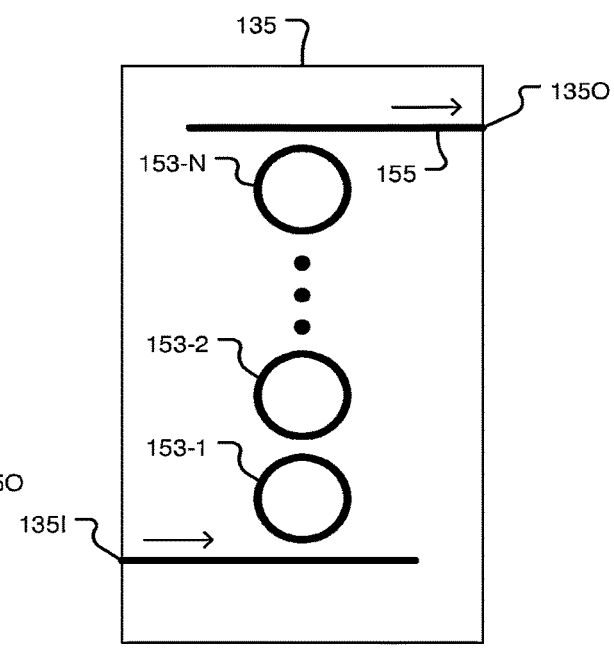
FIG. 1I shows an example implementation of the resonant device that includes multiple coupled ring resonators with a drop-port output, in accordance with some embodiments.
Figure 1J:
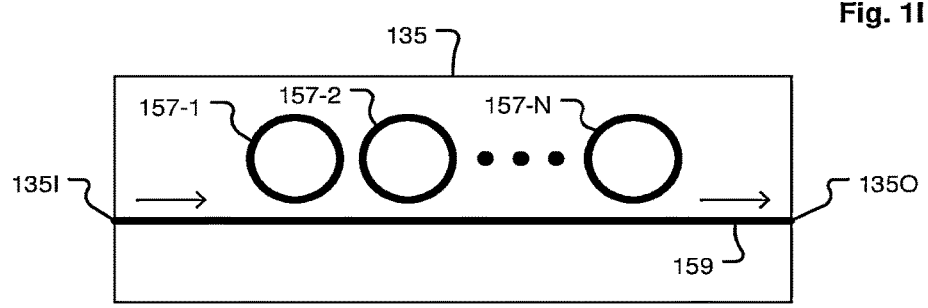
FIG. 1J shows an example implementation of the resonant device in which multiple ring resonators are cascaded to increase the optical signal delay with a through-port output, in accordance with some embodiments.
Figure 1K:
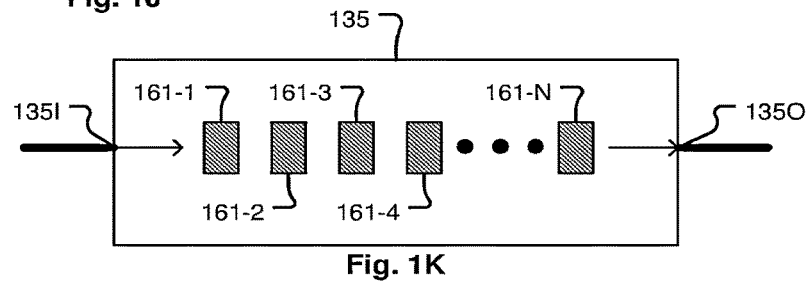
FIG. 1K shows an example implementation of the resonant device in which specially designed periodic structures are formed from a photonic bandgap material to build resonant cavities, in accordance with some embodiments.

In various embodiments, the resonant device 135 can be implemented in different ways. For example, FIG. 1F shows an example implementation of the resonant device 135 as a single ring resonator 141 with a through-port output 143, in accordance with some embodiments. FIG. 1G shows another example implementation of the resonant device 135 as a single ring resonator 145 with a drop-port output 147, in accordance with some embodiments. FIG. 1H shows an example implementation of the resonant device 135 that includes multiple coupled ring resonators 149-1 to 149-N, where N is greater than one, with a through-port output 151, in accordance with some embodiments. FIG. 1I shows an example implementation of the resonant device 135 that includes multiple coupled ring resonators 153-1 to 153-N, where N is greater than one, with a drop-port output 155, in accordance with some embodiments. In some embodiments, individual resonators are cascaded to increase the optical signal delay. For example, FIG. 1J shows an example implementation of the resonant device 135 in which multiple ring resonators 157-1 to 157-N, where N is greater than one, are cascaded to increase the optical signal delay, with a through-port output 159, in accordance with some embodiments. Also, in some embodiments, the resonant device 135 is implemented using photonic crystal cavities. For example, FIG. 1K shows an example implementation of the resonant device 135 in which specially designed periodic structures 161-1 to 161-N, where N is greater than one, are formed from a photonic bandgap material to build resonant cavities, in accordance with some embodiments.

Figure 2:
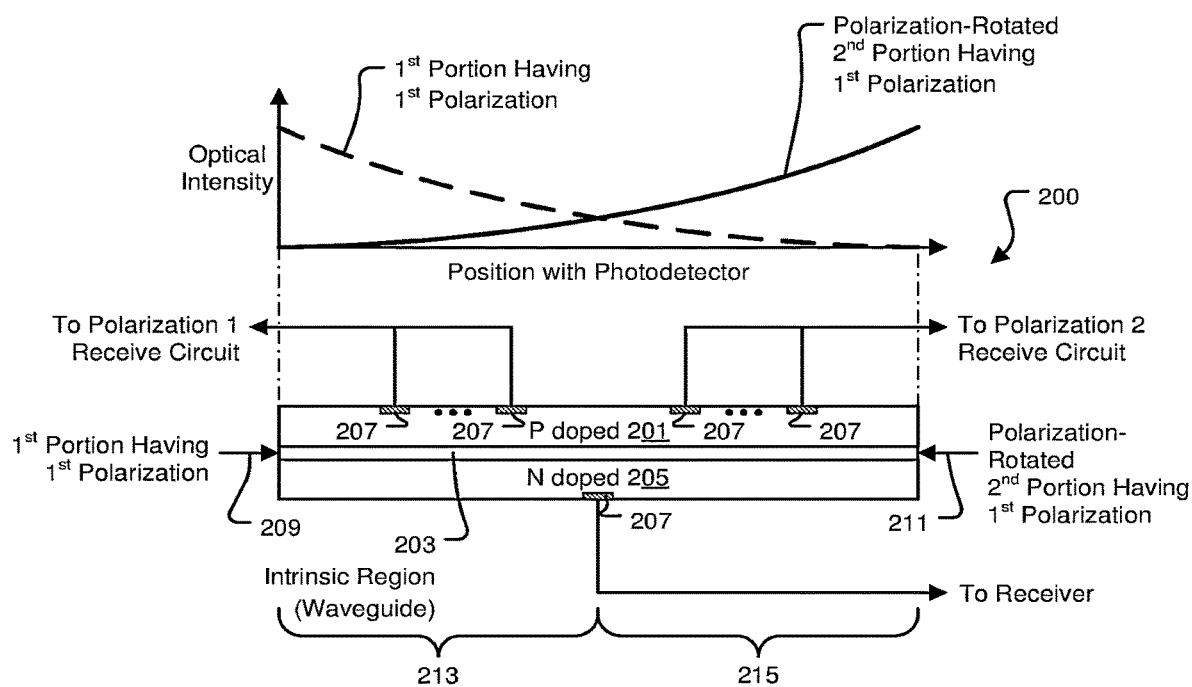
FIG. 2 shows a diagram of a top view of an example photodetector, in accordance with some embodiments.

FIG. 2 shows a diagram of a top view of an example photodetector 200, in accordance with some embodiments. In some embodiments, the photodetector 200 is used for the photodetector 115 in FIG. 1A. The photodetector 200 is shown as a PIN type of photodetector that includes a P doped region 201, an intrinsic region 203, and an N doped region 205. The intrinsic region 203 is positioned between the P doped region 201 and the N doped region 205. In some embodiments, the P doped region 201 and the N doped region 205 are switched. In some embodiments, the intrinsic region 203 is an optical waveguide through which light that is to be detected is directed. In some embodiments, at least a portion of the P doped region 201 and at least a portion of the N doped region 205 is formed within the optical waveguide. During operation the photodetector 200 is reverse-biased so that charge carriers generated by photo-absorption within the intrinsic region 203 are swept into electrical contacts 207 connected along the length of the photodetector 200.

The photodetector 200 enables the incoming light from each polarization to be detected independently. More specifically, the first portion of the incoming light having the first polarization is input through a first end of the photodetector 200, and the polarization-rotated second portion of the incoming light having the first polarization (but corresponding to the incoming light that had the second polarization) is input through a second end of the photodetector 200. Due to photo-absorption along the length of the photodetector 200, the intensity of the first portion of the incoming light having the first polarization as input through the first end of the photodetector 200 decays exponentially in accordance with the photo-absorption coefficient as the light travels along the length of the photodetector 200 in the first direction, as indicated by arrow 209. Similarly, the intensity of the polarization-rotated second portion of the incoming light having the first polarization as input through the second end of the photodetector 200 decays exponentially in accordance with the photo-absorption coefficient as the light travels along the length of the photodetector 200 in the second direction, as indicated by arrow 211. Therefore, a majority of the first portion of the incoming light having the first polarization is absorbed within a first half 213 of the photodetector 200, and a majority of polarization-rotated second portion of the incoming light having the first polarization is absorbed within a second half 215 of the photodetector 200. In some embodiments, the electrical contacts 207 along the first half 213 of the photodetector 200 are segmented and connected to a first reverse-biasing circuit and a first receive circuit, and the electrical contacts 207 along the second half 215 of the photodetector 200 are segmented and connected to a second reverse-biasing circuit and a second receive circuit. In these embodiments, comparison of the photocurrent measured by the first receive circuit to the photocurrent measured by the second receive circuit provides for determination of the relative optical power split between different polarizations within the incoming optical signal, given that the polarization-rotated second portion of the incoming signal actually corresponds to the second polarization within the incoming optical signal.

In some embodiments, an electro-optic receiver implements the WDM demultiplexer 100 as described with regard to FIGS. 1A-1E. In these embodiments, the electro-optic receiver includes a first optical waveguide, e.g., 101, that is optically connected to convey a first portion of incoming light, e.g., 117, in a first direction through the first optical waveguide. The first optical waveguide is also optically connected to convey a second portion of incoming light, e.g., 119, in a second direction through the first optical waveguide, where the second direction is opposite of the first direction. The electro-optic receiver also includes a ring resonator, e.g., 103, disposed within an evanescent optically coupling distance of the first optical waveguide, such that the first portion of incoming light and the second portion of incoming light couple into the ring resonator from the first optical waveguide, and such that the first portion of incoming light and the second portion of incoming light travel in opposite directions within the ring resonator. The electro-optic receiver also includes a second optical waveguide, e.g., 105, disposed within an evanescent optically coupling distance of the ring resonator, such that the first portion of incoming light and the second portion of incoming light couple into the second optical waveguide from the ring resonator, and such that the first portion of incoming light and the second portion of incoming light travel in opposite directions within the second optical waveguide away from the ring resonator. The electro-optic receiver also includes a photodetector, e.g., 115, optically connected to both a first end of the second optical waveguide and a second end of the second optical waveguide. In some embodiments, the photodetector is a double-ended photodetector configured to separately detect light that enters a first end of the photodetector from the first end of the second optical waveguide and light that enters a second end of the photodetector from the second end of the second optical waveguide, such as described with regard to FIG. 2.

In some embodiments, the electro-optic receiver includes a heater, e.g., 104, disposed within the ring resonator. The heater is controllable to in turn control a resonant wavelength of the ring resonator, such that only light within a narrow band around the resonant wavelength is able to couple into and out of the ring resonator. The term narrow band refers to a band of wavelengths defined about a given channel wavelength of light, such that the band of wavelengths is considered to correspond to the given channel wavelength of light. A wavelength range of the narrow band is defined to ensure that adjacent channel wavelengths of light are distinguishable from each other with regard to resonant coupling of light of a target wavelength into and out of the ring resonator 103.

In some embodiments, the electro-optic receiver includes an optical signal timing delay section, e.g., 107 and/or 109, disposed along the second optical waveguide at a location between the ring resonator and the photodetector. The optical signal timing delay section is configured to impart a controlled amount of temporal delay to a light signal that travels through the optical signal timing delay section. In some embodiments, the optical signal timing delay section is formed as an optical waveguide section having one or more of a folded shape, a convoluted shape, a spiral shape, a loop shape, and a zig-zag shape, among other shapes. In some embodiments, the optical waveguide section includes an input optical waveguide and an output optical waveguide that run side-by-side toward a central location, with the input optical waveguide and the output optical waveguide optically connected at the central location. For example, the optical signal timing delay section 125 has an input optical waveguide that runs from the input 129 toward the central location of the spiral shape, and an output optical waveguide that runs from the output 131 toward the central location of the spiral shape, with the input optical waveguide and the output optical waveguide optically connected at the central location of the spiral shape. In some embodiments, the input optical waveguide and the output optical waveguide are integrally formed as a single optical waveguide structure.

In some embodiments, the optical signal timing delay section includes an input optical waveguide, an output optical waveguide, and a resonant device, e.g., 135, having an input optically connected to the input optical waveguide and having an output optically connected to the output optical waveguide. For example, FIG. 1E shows the optical signal timing delay section 125A that has the input optical waveguide that runs from the input 129 toward the resonant device 135, and the output optical waveguide that runs from the output 131 toward the resonant device 135. In some embodiments, the input optical waveguide and the output optical waveguide run side-by-side over a distance to optically connect with the resonant device. In some embodiments, the input optical waveguide and the output optical waveguide run side-by-side in one or more of a folded manner, a convoluted manner, a spiral manner, a loop manner, and a zig-zag manner, among others, toward a location at which the resonant device is located, such as the spiral manner shown by way of example in FIG. 1E.

In some embodiments, the electro-optic receiver includes both a first optical signal timing delay section, e.g., 107, disposed at a location between the ring resonator, e.g., 103, and a first end of the second optical waveguide at the photodetector 115, and a second optical signal timing delay section, e.g., 109, disposed at a location between the ring resonator, e.g., 103, and a second end of the second optical waveguide at the photodetector 115. As with the first optical signal timing delay section, e.g., 107, the second optical signal timing delay section, e.g., 109, is configured to impart a controlled amount of temporal delay to a light signal that travels through the second optical signal timing delay section, e.g., 109. In some embodiments, the controlled amount of temporal delay imparted by the first optical signal timing delay section, e.g., 107, is different that the controlled amount of temporal delay imparted by the second optical signal timing delay section, e.g., 109.

In some embodiments, the electro-optic receiver includes a polarization beam splitter and rotator, e.g., 401/501, that has an input optically connected to receive incoming light. The polarization beam splitter and rotator is configured to direct a first part of the incoming light having a first polarization to a first output of the polarization beam splitter and rotator so as to provide the first portion of incoming light to the first end of the first optical waveguide, e.g., 101. The polarization beam splitter and rotator is also configured to direct a second part of the incoming light having a second polarization to a second output of the polarization beam splitter and rotator. The polarization beam splitter and rotator is also configured to rotate a polarization of a second part of the incoming light from a second polarization to the first polarization in route to the second output of the polarization beam splitter and rotator so as to provide the second portion of incoming light to the second end of the first optical waveguide, e.g., 101. In this manner, the first end of the first optical waveguide, e.g., 101, is optically connected to the first output of the polarization beam splitter and rotator, and the second end of the first optical waveguide, e.g., 101, is optically connected to the second output of the polarization beam splitter and rotator. In some embodiments, the electro-optic receiver includes an optical coupling device, e.g., 153, that is configured to transfer the incoming light from an optical fiber to the input of the polarization beam splitter and rotator.

In some embodiments, the electro-optic receiver includes an optical signal timing delay, e.g., $D_A$, disposed along the first optical waveguide, e.g., 101, at a location between the first output of the polarization beam splitter and rotator, e.g., 401/501, and the ring resonator, e.g., 103. In some embodiments, the optical signal timing delay, e.g., $D_A$, is configured to impart a temporal delay in an arrival time of the first portion of incoming light, e.g., 117, at the ring resonator, e.g., 103, where the temporal delay is set so that an arrival time of the second portion of incoming light, e.g., 119, at the ring resonator, e.g., 103, is substantially equal to the arrival time of the first portion of incoming light, e.g., 117 at the ring resonator. In some embodiments, the optical signal timing delay, e.g., $D_A$, is configured to compensate for a temporal delay between the first portion of incoming light, e.g., 117, leaving the first output of the polarization beam splitter and rotator, e.g., 401/501, and the second portion of incoming light, e.g., 119, leaving the second output of the polarization beam splitter and rotator, e.g., 401/501.

Figure 3:
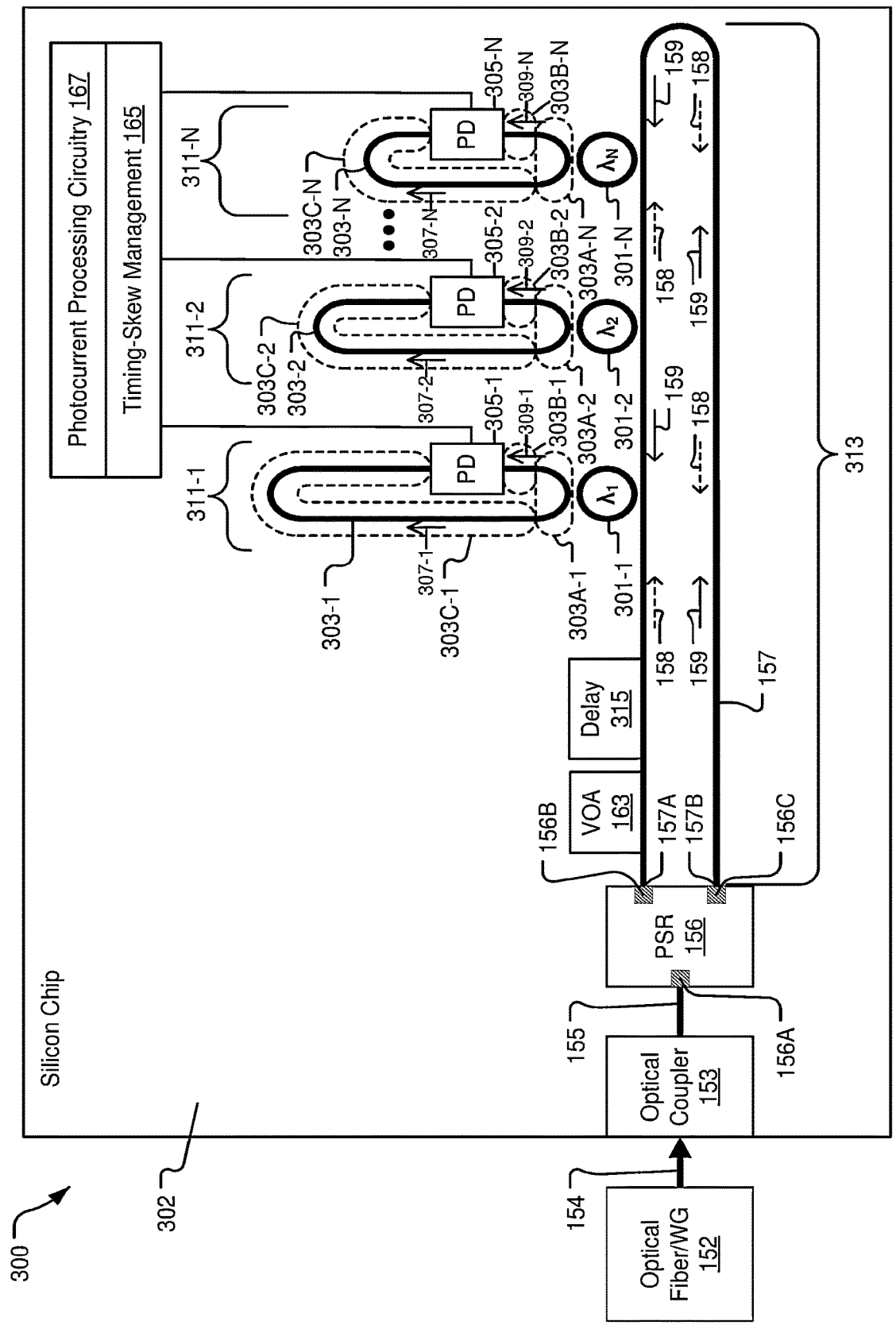
FIG. 3 shows an example configuration of an electro-optic receiver implemented within a photonic integrated circuit (PIC), in accordance with some embodiments.

FIG. 3 shows an example configuration of an electro-optic receiver 300 implemented within a PIC 302, in accordance with some embodiments. In some embodiments, the electro-optic receiver 300 is a WDM receiver that includes a series of N demultiplexers 311-1 to 311-N, where each of the N demultiplexers 311-1 to 311-N optically couples light of its wavelength band ($\lambda_1$ to $\lambda_N$, respectively) from an optical data bus 157 into a photodetector 305-1 to 305-N, respectively. In some embodiments, the series of N demultiplexers 311-1 to 311-N are disposed along a demultiplexer row 313. In a bidirectional polarization diverse system, an optical input signal is received from an optical fiber/waveguide 152 through an optical coupler 153 and is split into two optical input signals by a polarization-split-and-rotate (PSR) element 156. Then, the two split optical input signals are sent into the optical data bus 157 of the demultiplexer row 313 in opposite directions, as indicated by arrows 158 and 159. In some embodiments, optical signal timing delay compensation is provided at each of the photodetectors 305-1 to 305-N of the N demultiplexers 311-1 to 311-N. Also, in some embodiments, an optical signal timing delay 315 is provided on the optical data bus 157 at either end of the demultiplexer row 313. The optical signal timing delays are configured to ensure that the corresponding portions of the two split optical input signals (corresponding to the two different polarizations of the original optical input signal) arrive at a given photodetector 305-1 to 305-N of each of the N demultiplexers 311-1 to 311-N at substantially the same time. Additionally, in some embodiments, a variable optical attenuator 163 is provided on the optical data bus 157 to manage light returning back to the optical coupler 153 of the electro-optic receiver 300 (back to the optical fiber/waveguide 152 through which the original optical input signal was received), which appears as optical return loss in the larger system, and which could present system operational challenges, such as destabilizing laser operation.

The electro-optic receiver 300 receives the incoming optical signal from the optical fiber/waveguide 152 through the optical coupler 153, as indicated by arrow 154. The incoming optical signal is conveyed from the optical coupler 153 through the optical waveguide 155 to an optical input 156A of the PSR 156. The PSR 156 is configured to direct a first portion of the incoming light having a first polarization through a first optical output 156B of the PSR 156. The PSR 156 is also configured to rotate a polarization of a second portion of the incoming light from a second polarization to the first polarization so that the second portion of the incoming light is a polarization-rotated second portion of the incoming light. The PSR 156 is configured to direct the polarization-rotated second portion of the incoming light through a second optical output 156C of the PSR 156. In some embodiments, the optical data bus 157 is implemented as an optical waveguide within the PIC 302. A first end 157A of the optical data bus 157 is optically connected to the first optical output 156B of the PSR 156. A second end 157B of the optical data bus 157 is optically connected to the second optical output 156C of the PSR 156. The optical data bus 157 is formed of a material through which light can be in-coupled, out-coupled, and guided. The optical data bus 157 is formed within a surrounding material that has an optical index of refraction sufficiently different from that of the optical data bus 157 to enable guiding of light within the optical data bus 157. The optical data bus 157 has the continuous, loop-like structure. In this manner, the first portion of the incoming light travels from the first optical output 156A of the PSR 156 through the optical data bus 157 in a first direction, as indicated by arrows 158. Also, the polarization-rotated second portion of the incoming light travels from the second optical output 156C of the PSR 156 through the optical data bus 157 in a second direction that is opposite the first direction, as indicated by arrows 159.

Each of the N demultiplexers 311-1 to 311-N includes a corresponding ring resonator 301-1 to 301-N, respectively, positioned alongside the optical data bus 157 and within an evanescent optical coupling distance of the optical data bus 157. It should be understood that in various embodiments, the electro-optic receiver 300 can include any number N of demultiplexers 311-1 to 311-N and corresponding ring resonators 301-1 to 301-N positioned alongside the optical data bus 157, so long as the ring resonators 301-1 to 301-N and associated signal processing circuitry can be spatially and electrically accommodated on the chip that include the PIC 302. In some embodiments, the ring resonators 301-1 to 301-N are implemented as annular-shaped waveguides having a circuitous configuration, e.g., circular, oval, race-track, or another arbitrary circuitous shape. In some embodiments, the ring resonators 301-1 to 301-N are implemented as circular discs. The ring resonators 301-1 to 301-N are formed of a material through which light can be in-coupled, out-coupled, and guided. Each of the ring resonators 301-1 to 301-N is formed within a surrounding material that has an optical index of refraction sufficiently different from that of the ring resonators 301-1 to 301-N to enable guiding of light within the ring resonators 301-1 to 301-N and around the circuitous path defined by each of the ring resonators 301-1 to 301-N. In some embodiments, each of the ring resonators 301-1 to 301-N is configured to have an annular-shape or disc-shape with an outer diameter of less than about 50 micrometers. In some embodiments, each of the ring resonators 301-1 to 301-N is configured to have an annular-shape or disc-shape with an outer diameter of less than about 10 micrometers.

Each of the plurality of ring resonators 301-1 to 301-N is configured to operate at a respective resonant wavelength $\lambda_1$ to $\lambda_N$. In this manner, the first portion of the incoming light having a wavelength substantially equal to the respective resonant wavelength of a given one of the plurality of ring resonators 301-1 to 301-N optically couples into the given one of the plurality of ring resonators 301-1 to 301-N in a first propagation direction (e.g., counterclockwise), and the polarization-rotated second portion of the incoming light having a wavelength substantially equal to the respective resonant wavelength of the given one of the plurality of ring resonators 301-1 to 301-N optically couples into the given one of the plurality of ring resonators 301-1 to 301-N in a second propagation direction (e.g., clockwise) opposite the first propagation direction. For example, the first portion of the incoming light having a particular wavelength $\lambda_x$ travels in the direction indicated by arrow 158 through the optical data bus 157 and optically couples into the ring resonator 301-$x$ (where x is 1 to N) operating at the particular wavelength $\lambda_x$ and propagates in a counter-clockwise direction within the ring resonator 301-$x$. The polarization-rotated second portion of the incoming light having a particular wavelength $\lambda_x$ travels in the direction indicated by arrow 159 through the optical data bus 157 and optically couples into the ring resonator 301-$x$ operating at the particular wavelength $\lambda_x$ and propagates in a clockwise direction within the ring resonator 301-$x$.

Each of the N demultiplexers 311-1 to 311-N includes an output optical waveguide 303-1 to 303-N, respectively, positioned within an evanescent optical coupling distance of the corresponding ring resonators 301-1 to 301-N, respectively. Each of the output optical waveguides 303-1 to 303-N includes a coupling section 303A-1 to 303A-N, respectively. Each of the plurality of output optical waveguides 303-1 to 303-N includes a short section 303B-1 to 303B-N, respectively. Each of the plurality of output optical waveguides 303-1 to 303-N includes a long section 303C-1 to 303C-N, respectively. Each of the coupling sections 303A-1 to 303A-N is positioned to evanescently in-couple light from a corresponding one of the ring resonators 301-1 to 301-N, respectively. In this manner, each of the ring resonators 301-1 to 301-N operates to transfer a particular wavelength $\lambda_1$ to $\lambda_N$, respectively, of the first portion of the incoming light and the polarization-rotated second portion of the incoming light from the optical data bus 157 to the corresponding one of the output optical waveguides 303-1 to 303-N, respectively. The first portion of the incoming light that propagates in the counter-clockwise direction within the ring resonators 301-1 to 301-N is optically coupled through the corresponding coupling section 303A-1 to 303A-N, respectively, and into the corresponding long section 303C-1 to 303C-N, respectively, as indicated by arrows 307-1 to 307-N, respectively. The polarization-rotated second portion of the incoming light that propagates in the clockwise direction within the ring resonators 301-1 to 301-N is optically coupled through the corresponding coupling section 303A-1 to 303A-N, respectively, and into the corresponding short section 303B-1 to 303B-N, respectively, as indicated by arrows 309-1 to 309-N, respectively.

The output optical waveguides 303-1 to 303-N are formed of a material through which light can be in-coupled, out-coupled, and guided. Each of the output optical waveguides 303-1 to 303-N is formed within a surrounding material that has an optical index of refraction sufficiently different from that of the output optical waveguides 303-1 to 303-N, respectively, to enable guiding of light within the output optical waveguides 303-1 to 303-N. In some embodiments, the output optical waveguides 303-1 to 303-N are implemented to have a race-track type shape. However, it should be understood that in other embodiments, the output optical waveguides 303-1 to 303-N can be implemented to have an arbitrary shape, so long as they include the coupling section 303A-1 to 303A-N, respectively, and the short section 303B-1 to 303B-N, respectively, and the long section 303C-1 to 303C-N, respectively.

Each of the N demultiplexers 311-1 to 311-N includes a corresponding photodetector 305-1 to 305-N, respectively, that is associated with the corresponding ring resonator 301-1 to 301-N, respectively. The short section 303B-1 to 303B-N of the output optical waveguides 303-1 to 303-N, respectively, extends from a first end of the corresponding coupling section 303A-1 to 303A-N, respectively, to the corresponding photodetector 305-1 to 305-N, respectively. The long section 303C-1 to 303C-N of the output optical waveguides 303-1 to 303-N, respectively, extends from a second end of the corresponding coupling section 303A-1 to 303A-N, respectively, to the corresponding photodetector 305-1 to 305-N, respectively. In some embodiments, each of the photodetectors 305-1 to 305-N is a photodetector, such as the photodetector 200 described with regard to FIG. 2. In these embodiments, the short section 303B-1 to 303B-N of the corresponding one of the output optical waveguides 303-1 to 303-N, respectively, is optically connected to a first end of the photodetector, and the long section 303C-1 to 303C-N of the corresponding one of the output optical waveguides 303-1 to 303-N, respectively, is optically connected to a second end of the photodetector.

A length of the long section 303C-1 to 303C-N and a length of the short section 303B-1 to 303B-N within a given one of the output optical waveguides 303-1 to 303-N, respectively, are defined to reduce a difference in arrival time of the first portion of the incoming light and the polarization-rotated second portion of the incoming light at the corresponding photodetector 305-1 to 305-N, respectively. Because the distance along the optical data bus 157 from the second end 157B of the optical data bus 157 to each of the ring resonators 301-1 to 301-N is different, the length of the long section 303C-1 to 303C-N is different for each of the output optical waveguides 303-1 to 303-N, respectively. In some embodiments, the length of the long section 303C-1 to 303C-N decreases as a distance between the corresponding ring resonators 301-1 to 301-N, respectively, and the midpoint of the optical data bus 157 decreases, where the midpoint of the optical data bus 157 is about halfway between the first end 157A and the second end 157B of the optical data bus 157.

In some embodiments, the electro-optic receiver 300 also includes a timing-skew management system 165 configured to electronically compensate for a temporal difference in photocurrent generation by any given one of the photodetectors 305-1 to 305-N caused by the difference in arrival time of the first portion of the incoming light and the polarization-rotated second portion of the incoming light at the given one of the photodetectors 305-1 to 305-N. After the timing-skew management system 165 operates to electronically compensate for the temporal difference in photocurrent generation by each of the photodetectors 305-1 to 305-N, the photocurrents generated by each of the photodetectors 305-1 to 305-N are transmitted to photocurrent processing circuitry 167 to decode the photocurrents into digital data patterns as conveyed by the incoming optical signal. In some embodiments where light from different polarizations is made to have a same polarization and is directed to the same photodetector 305-1 to 305-N, there may be a time delay difference (timing-skew) between the optical signals from each polarization state. After converting the combined optical signal into an electronic signal with the photodetector 305-1 to 305-N, the timing-skew manifests itself as a notch filter around an electrical radiofrequency component of the baseband signal. The center frequency of the notch filter is dependent on the magnitude of the timing-skew, and the depth of the notch filter is determined by the relative split in optical power between the two polarization states. For a digital communications application, this notch filter results in increased inter-symbol interference (ISI). The timing-skew management system 165 is configured to detect the presence of the timing-skew, determine the magnitude of the timing-skew, and compensate for the timing-skew in the photocurrent-based signals that are transmitted to the photocurrent processing circuitry 167.

Figure 4A:
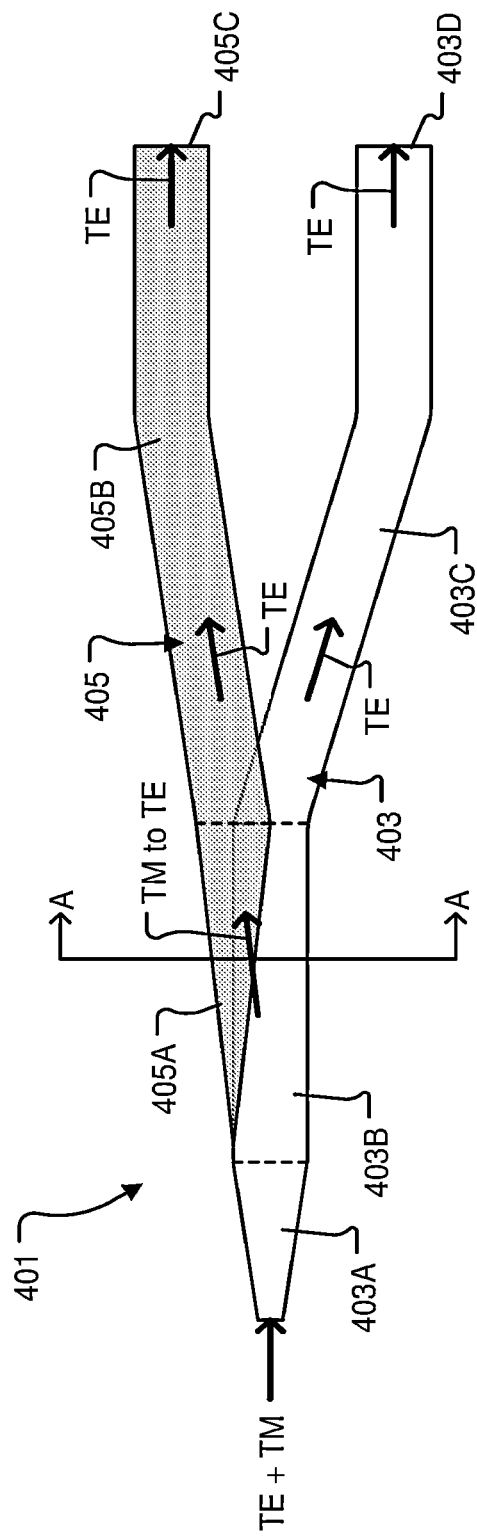
FIG. 4A shows an example configuration of a polarization splitter and rotator (PSR), in accordance with some embodiments.
Figure 4B:
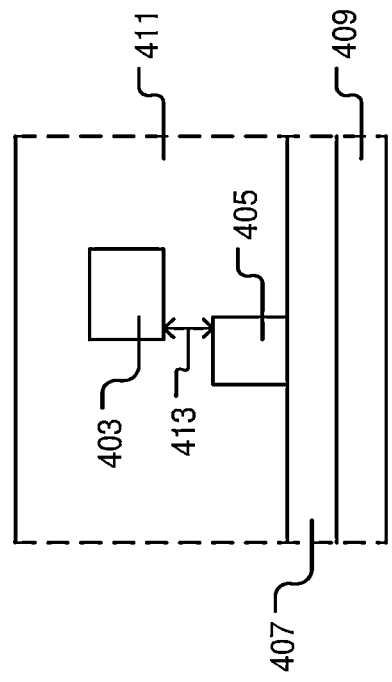
FIG. 4B shows a vertical cross-section view through the example PSR of FIG. 4A, referenced as View A-A in FIG. 4A, in accordance with some embodiments.

FIG. 4A shows an example configuration of a PSR 401, in accordance with some embodiments. It should be understood that the example PSR 401 can be used for the PSR 156 and/or any of the PSR's referred to herein. Also, it should be understood that the PSR 401 is provided by way of example and in no way limits how the PSR 156 and/or any of PSR's referred to herein can be configured in various embodiments. The PSR 401 includes a first optical waveguide 403 and a second optical waveguide 405. FIG. 4B shows a vertical cross-section view through the example PSR 401, referenced as View A-A in FIG. 4A, in accordance with some embodiments. In some embodiments, the first optical waveguide 403 is a silicon nitride optical waveguide, and the second optical waveguide 405 is a silicon optical waveguide. In some embodiments, the PSR 401 is formed on a buried oxide (BOX) layer 407 that is disposed over a substrate 409. In some embodiments, the first optical waveguide 403 and the second optical waveguide 405 are formed within an optical cladding 411. In some embodiments, the optical cladding 411 is silicon dioxide. The first optical waveguide 403 is vertical separated from the second optical waveguide 405 by a layer of the optical cladding 411, as indicated by arrow 413.

The first optical waveguide 403 includes an input section 403A connected to receive incoming light that includes both the TE and TM polarizations. In some embodiments, the input section 403A is configured as an inverse taper to convert a spot size of the incoming light to the optical mode of the first optical waveguide 403. After the input section 403A (with respect to the light propagation direction) the first optical waveguide 403 includes a rotation/splitting section 403B. In some embodiments, the rotation/splitting section 403B has a substantially linear shape. After the rotation/splitting section 403B, the first optical waveguide 403 includes an output section 403C that is optically connected to a first optical output 403D of the PSR 401. The first optical waveguide 403 is configured such that a portion of the incoming light having a first polarization (TE or TM) travels through the first optical waveguide 403 to the first optical output 403D of the PSR 401 in a substantially unchanged manner. The example PSR 401 shows the TE polarization of the incoming light traveling through the first optical waveguide 403 to the first optical output 403D of the PSR 401 in a substantially unchanged manner.

The second optical waveguide 405 includes a rotation/splitting section 405A that is configured to evanescently in-couple the TM polarization of the incoming light from the rotation/splitting section 403B of the first optical waveguide 403 and simultaneously rotate the in-coupled TM polarization to the TE polarization. To accomplish this, the rotation/splitting section 405A of the second optical waveguide 405 has an inverse taper configuration that positioned off-center (having a lateral offset in a direction perpendicular to the light propagation direction) with respect to the rotation/splitting section 403B of the first optical waveguide 403. The lateral offset of the rotation/splitting section 405A of the second optical waveguide 405 with respect to the rotation/splitting section 403B of the first optical waveguide 403 serves to break horizontal and vertical symmetry so as to rotate the TM0 mode in the rotation/splitting section 403B of the first optical waveguide 403 to a rotated TE0 mode and couple this rotated TE0 mode into the rotation/splitting section 405A of the second optical waveguide 405. The rotated TE0 mode is conveyed through an output section 405B of the second optical waveguide 405 to a second optical output 405C of the PSR 401. While the example PSR 401 shows the TE polarization of the incoming light traveling through the first optical waveguide 403 to the first optical output 403D of the PSR 401 in a substantially unchanged manner, and shows the TM polarization of the incoming light being rotated to the TE polarization in route to the second optical output 405C of the PSR 401, other embodiments of the PSR 401 are configured to have the TM polarization of the incoming light travel through the first optical waveguide 403 to the first optical output 403D of the PSR 401 in a substantially unchanged manner, with the TE polarization of the incoming light rotated to the TM polarization in route to the second optical output 405C of the PSR 401.

Figure 5A:
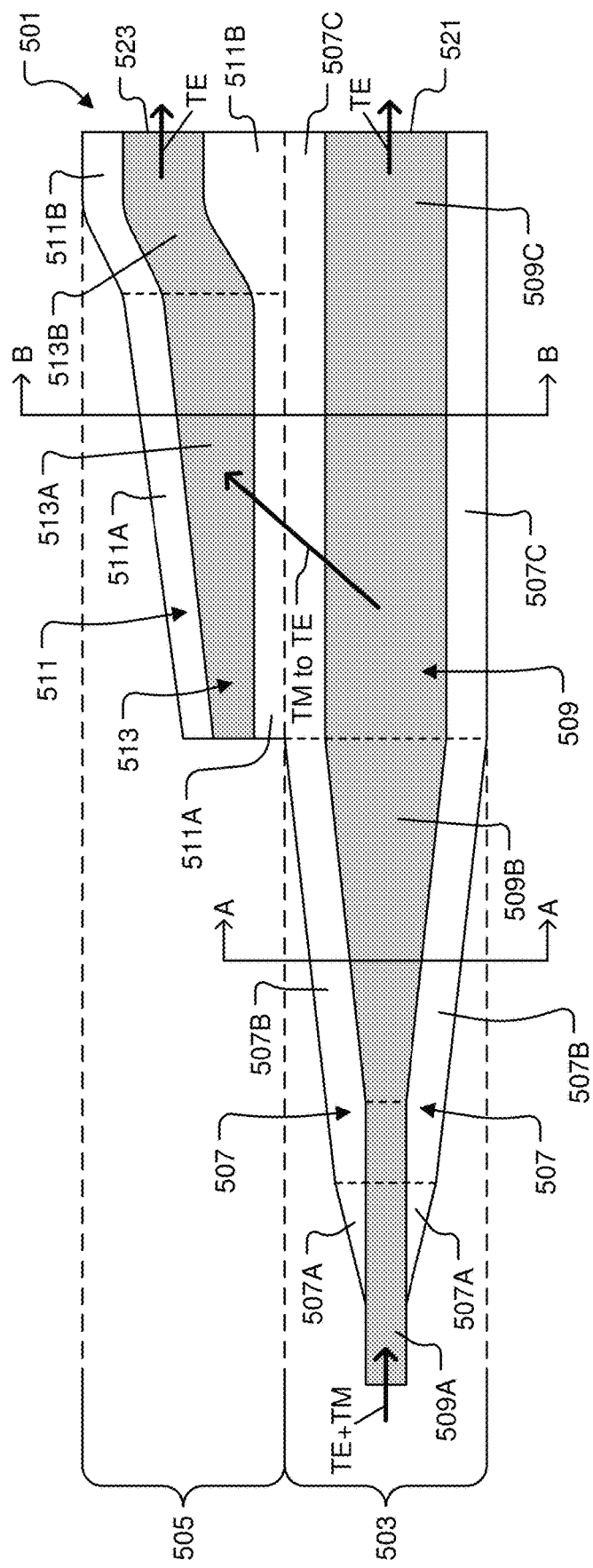
FIG. 5A shows an example configuration of a PSR, in accordance with some embodiments.
Figure 5C:
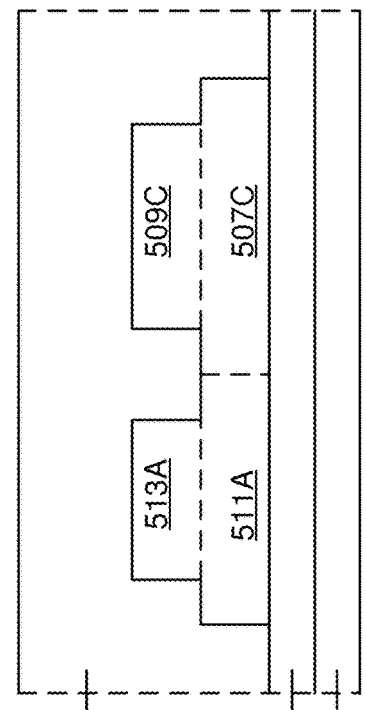
FIG. 5C shows a vertical cross-section view through the example PSR of FIG. 5A, referenced as View B-B in FIG. 5A, in accordance with some embodiments.
Figure 5B:
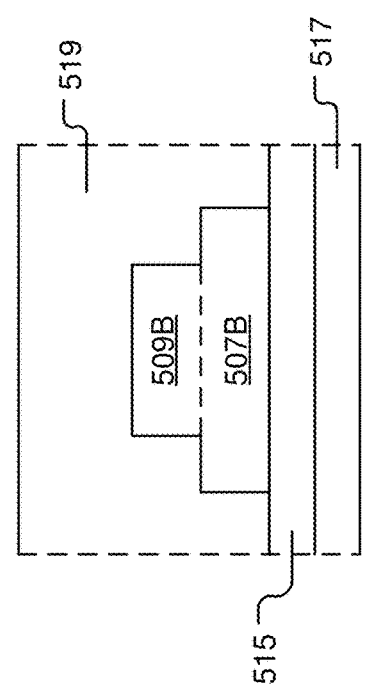
FIG. 5B shows a vertical cross-section view through the example PSR of FIG. 5A, referenced as View A-A in FIG. 5A, in accordance with some embodiments.

FIG. 5A shows an example configuration of a PSR 501, in accordance with some embodiments. It should be understood that the example PSR 501 can be used for the PSR 156 and/or any of the PSR's referred to herein. Also, it should be understood that the PSR 501 is provided by way of example and in no way limits how the PSR 156 and/or any of PSR's referred to herein can be configured in various embodiments. The PSR 501 is a broadband PSR that implements rib-type optical waveguides. The PSR 501 includes a first branch 503 and a second branch 505. The PSR 501 is configured as an optical waveguide system that includes a first branch slab waveguide 507, a first branch rib waveguide 509, a second branch slab waveguide 511, and a second branch rib waveguide 513. FIG. 5B shows a vertical cross-section view through the example PSR 501, referenced as View A-A in FIG. 5A, in accordance with some embodiments. FIG. 5C shows a vertical cross-section view through the example PSR 501, referenced as View B-B in FIG. 5A, in accordance with some embodiments. In some embodiments, the first branch slab waveguide 507, the second branch slab waveguide 511, the first branch rib waveguide 509, and the second branch rib waveguide 513 are integrally formed as a monolithic optical waveguide structure, in which the first branch slab waveguide 507, the second branch slab waveguide 511, the first branch rib waveguide 509, and the second branch rib waveguide 513 form different parts of the monolithic optical waveguide structure. In some embodiments, the monolithic optical waveguide structure is formed as a silicon optical waveguide. In some embodiments, the monolithic optical waveguide structure is formed as a silicon nitride optical waveguide. In some embodiments, the PSR 501 is formed on a BOX layer 515 that is disposed over a substrate 517. In some embodiments, the monolithic optical waveguide structure that includes the first branch slab waveguide 507, the second branch slab waveguide 511, the first branch rib waveguide 509, and the second branch rib waveguide 513 is formed within an optical cladding 519. In some embodiments, the optical cladding 519 is silicon dioxide.

The first branch rib waveguide 509 includes an input section 509A that has a substantially linear shape, followed by a tapered section 509B, followed by an output section 509C (with respect to a light propagation direction through the PSR 501). The first branch slab waveguide 507 includes tapered input section 507A, followed by a tapered section 507B (corresponding to the rib tapered section 509B), followed by an output section 507C (corresponding to the rib output section 509C). The second branch rib waveguide 513 includes a tapered section 513A, followed by an output section 513B (with respect to a light propagation direction through the PSR 501). The second branch slab waveguide 511 includes tapered section 511A (corresponding to the rib tapered section 513A, followed by an output section 511B (corresponding to the rib output section 513B). In some embodiments, a portion of the output section 511B of the second branch slab waveguide 511 located between the first branch rib waveguide 509 and the second branch rib waveguide 513 has an increasing width along the light propagation direction to provide for easier optical routing of the outputs of the first branch 503 and the second branch 505 to separate output optical waveguides.

The input section 509A and the tapered section 509B of the first branch rib waveguide 509, and the tapered input section 507A and the tapered section 507B of the first branch slab waveguide 507, collectively function as a polarization rotator. The output section 509C of the first branch rib waveguide 509 and the output section 507C of the first branch slab waveguide 507, and the tapered section 513A of the second branch rib waveguide 513 and the tapered section 511A of the second branch slab waveguide 511, collectively function as a polarization splitter. In this manner, the TE0 polarization of the incoming light is transmitted in a substantially unchanged manner through the first branch 503 to a first optical output 521 of the PSR 501. The TM0 polarization of the incoming light is rotated to a TE1 polarization and then to a TE0 polarization as this portion of the incoming light is transmitted through the first branch 503 and is optically coupled into the second branch 505 in route to a second optical output 523 of the PSR 501. Alternatively, in some other embodiments, the PSR 501 is configured to pass through the TM polarization of the incoming light in a substantially unchanged manner and rotate/split the TE polarization of the incoming light to outgoing TM polarized light.

It should be understood that the PSR 401 and the PSR 501 are provided as examples of how the PSR's described herein may be implemented in some example embodiments. It should also be understood that in some embodiments, any of the PSR's described herein can be implemented as a dual-polarization grating coupler. It should be understood that the example PSR 401 and the example PSR 501 do not limit in any way how the various PSR's described herein can be implemented in various embodiments. Any of the PSR's described herein can be implemented in different ways so long as one of the two input polarizations (TE or TM) of incoming light received by the PSR is rotated to the other polarization and is directed to one of two outputs of the PSR, with the non-rotated polarization of the incoming light being directed to another of the two outputs of the PSR.

FIG. 6 shows an example WDM receiver row 600, in accordance with some embodiments. The WDM receiver row 600 includes a number N of WDM demultiplexers 601-1 to 601-N positioned within an evanescent optical coupling distance of an optical waveguide 602. The optical waveguide 602 functions as an optical data bus within the WDM receiver row 600. In some embodiments, the number N is an integer value of one or more. In some embodiments, the WDM receiver row 600 includes a plurality of WDM demultiplexers 601-1 to 601-N, where the number N is an integer value of two or more. In some embodiments, the WDM receiver row 600 includes a plurality of WDM demultiplexers 601-1 to 601-N, where the number N is an even integer value of two or more. In some embodiments, the WDM receiver row 600 includes a plurality of WDM demultiplexers 601-1 to 601-N, where the number N is an odd integer value greater than 1. In some embodiments, each of the WDM demultiplexers 601-1 to 601-N is configured in the same manner as the WDM demultiplexer 100 described with regard to FIGS. 1A through 1E. In particular, each of the WDM demultiplexers 601-1 to 601-N includes a ring resonator 103-1 to 103-N, respectively, that is positioned within an evanescent optical coupling distance of the optical waveguide 602. In some embodiments, each of the WDM demultiplexers 601-1 to 601-N includes a heater 104-1 to 104-N, respectively, disposed within the ring resonator 103-1 to 103-N, respectively. The heaters 104-1 to 104-N provide for control of the resonant wavelength $\lambda_1$ to $\lambda_N$ of the ring resonator 103-1 to 103-N, respectively, and the corresponding operational wavelength range of the WDM demultiplexer 601-1 to 601-N, respectively.

Each of the WDM demultiplexers 601-1 to 601-N includes a first optical signal timing delay section 107-1 to 107-N, respectively, and a second optical signal timing delay section 109-1 to 109-N, respectively, optically connected to opposite ends of an optical waveguide 105-1 to 105-N, respectively. The optical waveguide 105-1 to 105-N extends past and within an evanescent optical coupling distance of the corresponding ring resonator 103-1 to 103-N, respectively, such that light propagating within the ring resonator 103-1 to 103-N couples into the optical waveguide 105-1 to 105-N, respectively. The first optical signal timing delay section 107-1 to 107-N provides an optical signal delay $D_{1A}$ to $D_{NA}$, respectively, to a first optical signal that travels from a first Port A through the optical waveguide 602 and into the WDM demultiplexer 601-1 to 601-N, respectively. As described with regard to FIG. 1B, the first optical signal having the wavelength $\lambda_x$ couples into the ring resonator 103-x operating at the resonant wavelength $\lambda_x$ from the optical waveguide 602, and travels in a counterclockwise direction within the ring resonator 103-x so as to optically couple into the optical waveguide 105-x and travel to the first optical signal timing delay section 107-x, where x is any of 1 to N. The first optical signal travels from the first optical signal timing delay section 107-1 to 107-N through an optical waveguide 111-1 to 111-N, respectively, to a first input 115A-1 to 115A-N, respectively, of the photodetector 115-1 to 115-N, respectively.

The second optical signal timing delay section 109-1 to 109-N provides an optical signal delay $D_{1B}$ to $D_{NB}$, respectively, to a second optical signal that travels from a second Port B through the optical waveguide 602 and into the WDM demultiplexer 601-1 to 601-N, respectively. As described with regard to FIG. 1C, the second optical signal having the wavelength $\lambda_x$ couples into the ring resonator 103-x operating at the resonant wavelength $\lambda_x$ from the optical waveguide 602, and travels in a clockwise direction within the ring resonator 103-x so as to optically couple into the optical waveguide 105-x and travel to the second optical signal timing delay section 109-x, where x is any of 1 to N. The second optical signal travels from the second optical signal timing delay section 109-1 to 109-N through an optical waveguide 113-1 to 113-N, respectively, to a second input 115B-1 to 115B-N, respectively, of the photodetector 115-1 to 115-N, respectively. In some embodiments, the first optical signal that travels from the first Port A and the second optical signal that travels from the second Port B are opposite polarized portions of the same original input signal received by an electro-optic receiver that includes the WDM receiver row 600, where one of the two polarizations (TE or TM) of the same original input signal has been rotated to the other polarization. For example, in some embodiments, the first Port A is a first output port of a PSR, such as the PSR 401 of FIGS. 4A and 4B or the PSR 501 of FIGS. 5A through 5C, and the second Port B is a second output port of the PSR. Implementation of both the optical signal timing delay $D_{xA}$ and the optical signal timing delay $D_{xB}$ within a given WDM demultiplexer 601-x (where x is an integer within the range extending from 1 to N) is equivalent to implementing a single differential optical signal timing delay for optical signals traveling through the optical waveguide 105-x toward the photodetector 115-x. Therefore, in some embodiments, either the optical signal timing delay $D_{xA}$ or the optical signal timing delay $D_{xB}$ is implemented within the given WDM demultiplexer 601-x, without implementing both of the optical signal timing delay $D_{xA}$ and the optical signal timing delay $D_{xB}$ within the given WDM demultiplexer 601-x.

Additionally, in some embodiments, one or more optical signal timing delays are implemented along the optical waveguide 602. For example, in some embodiments, an optical signal timing delay $D_A$ is implemented at a first end of the optical waveguide 602 to receive and delay the first optical signal that travels from the first Port A before it reaches the first WDM demultiplexer 601-1. The optical signal timing delay $D_A$ is configured to introduce a controlled amount of temporal delay in propagation of the first optical signal from the first Port A to the first WDM demultiplexer 601-1. In some embodiments, an optical signal timing delay $D_B$ is implemented at a second end of the optical waveguide 602 to receive and delay the second optical signal that travels from the second Port B before it reaches the $N^{th}$ WDM demultiplexer 601-N. The optical signal timing delay $D_B$ is configured to introduce a controlled amount of temporal delay in propagation of the second optical signal from the second Port B to the $N^{th}$ WDM demultiplexer 601-N. In some embodiments, the optical signal timing delay $D_A$ and the optical signal timing delay $D_B$ are implemented at opposite ends of the optical waveguide 602. Implementation of both the optical signal timing delay $D_A$ and the optical signal timing delay $D_B$ is equivalent to implementing a single differential optical signal timing delay for optical signals traveling through the optical waveguide 602. Therefore, in some embodiments, either the optical signal timing delay $D_A$ or the optical signal timing delay $D_B$ is implemented at one end of the optical waveguide 602. In some embodiments, each of the optical signal timing delay $D_A$ and the optical signal timing delay $D_B$ provides about the same amount of optical signal timing delay. In some embodiments, the optical signal timing delay $D_A$ and the optical signal timing delay $D_B$ provide different amounts of optical signal timing delay.

The WDM demultiplexers 601-1 to 601-N are positioned along the optical waveguide 602 such that adjacently positioned ones of the WDM demultiplexers 601-1 to 601-N are separated from each other by a length $L_1$ to $L_{N-1}$, respectively, of the optical waveguide 602. The length $L_m$ of the optical waveguide 602 extends between optical coupling locations of the ring resonators 103-m and 103-(m+1) of the WDM demultiplexers 601-m and 601-(m+1), respectively, where m is an integer within the range extending from 1 to (N−1). For example, the optical coupling locations of the ring resonators 103-1 and 103-2 of the WDM demultiplexers 601-1 and 601-2, respectively, are separated by the length $L_1$ of the optical waveguide 602. Likewise, the optical coupling locations of the ring resonators 103-(N−1) and 103-N of the WDM demultiplexers 601-(N−1) and 601-N, respectively, are separated from each other by the length $L_{N-1}$ of the optical waveguide 602. In some embodiments, the optical coupling location of a given ring resonator 103-1 to 103-N is the location along the optical waveguide 602 at which a minimum distance exists between the given ring resonator 103-1 to 103-N and the optical waveguide 602. The lengths $L_1$ to $L_{N-1}$ of the various sections of the optical waveguide 602 between the adjacently positioned ones of the WDM demultiplexers 601-1 to 601-N determine the intrinsic optical signal delay between the various WDM demultiplexers 601-1 to 601-N along the WDM receiver row 600.

As described above, in some embodiments of the WDM receiver row 600, there are N+1 differential optical signal timing delay control parameters ($D_A/D_B$ and $D_{1A}/D_{1B}$ to $D_{NA}/D_{NB}$) and N optical signals traveling through the WDM receiver row 600 whose differential optical signal timing delay needs to be equalized. Therefore, with the WDM receiver row 600, it is possible to equalize the differential optical signal timing delays for all WDM wavelength channels $\lambda_1$ to $\lambda_N$. In some embodiments, the optical signal timing delay $D_A$ and/or the optical signal timing delay $D_B$ are/is implemented on the optical waveguide 602 to minimize the other optical signal timing delays $D_{1A}/D_{1B}$ to $D_{NA}/D_{NB}$ within the various WDM demultiplexers 601-1 to 601-N. In some embodiments, a differential time delay $\tau_{AB}$ is determined between the first port A and the second port B, e.g., between the first and second output ports of the PSR. In general, the optical signal delay at the first port A and the optical signal delay at the second port B includes the polarization-dependent optical signal delay of an optical coupler (e.g., edge-coupler) of the electro-optic receiver, the optical signal delay of the PSR, and the optical signal delay(s) of all other optical element(s) leading up to the first port A and the second port B, respectively. With the differential time delay $\tau_{AB}$ known, along with knowing the optical signal timing delays $D_A$ and/or $D_B$, the differential optical signal timing delays $D_{1A}/D_{1B}$ to $D_{NA}/D_{NB}$ within the WDM demultiplexers 601-1 to 601-N are determined to equalize the differential optical signal timing delays at the photodetectors 115-1 to 115-N for each of WDM wavelength channels $\lambda_1$ to $\lambda_N$.

FIG. 7 shows an example WDM receiver row 700, in accordance with some embodiments. The WDM receiver row 700 is a variation of the WDM receiver row 600 of FIG. 6. The WDM receiver row 700 includes the WDM demultiplexers 601-1 to 601-N. However, each of the first half of the WDM demultiplexers 601-1 to 601-(N/2) does not include the optical signal delay $D_{1B}$ to $D_{(N/2)B}$, respectively, positioned between the ring resonator 103-1 to 103-(N/2), respectively, and the second input 115B-1 to 115B-(N/2), respectively, of the photodetector 115-1 to 115-(N/2), respectively. Instead, in each of the WDM demultiplexers 601-1 to 601-(N/2), the optical waveguide 105-1 to 105-(N/2), respectively, extends from its location proximate to the ring resonator 103-1 to 103-(N/2), respectively, to the second input 115B-1 to 115B-(N/2), respectively, of the photodetector 115-1 to 115-(N/2). Similarly, each of the second half of the WDM demultiplexers 601-[(N/2)+1] to 601-N does not include the optical signal delay $D_{[(N/2)+1]B}$ to $D_{NB}$, respectively, positioned between the ring resonator 103-[(N/2)+1] to 103-N, respectively, and the first input 115A-[(N/2)+1] to 115A-N, respectively, of the photodetector 115-[(N/2)+1] to 115-N, respectively. Instead, in each of the WDM demultiplexers 601-[(N/2)+1] to 601-N, the optical waveguide 105-[(N/2)+1] to 105-N, respectively, extends from its location proximate to the ring resonator 103-[(N/2)+1] to 103-N, respectively, to the first input 115A-[(N/2)+1] to 115A-N, respectively, of the photodetector 115-[(N/2)+1] to 115-N. Also, the optical signal timing delay $D_A$ between the first Port A and the first WDM demultiplexer 601-1 is implemented, but the optical signal timing delay $D_B$ is not implemented between the second Port B and the $N^{th}$ WDM demultiplexer 601-N.

Because of the time required for the light to travel down the optical waveguide 602, the first half of the WDM demultiplexers 601-1 to 601-(N/2) closest to the first port A will receive the first optical signal that travels from the first Port A before it receives the second optical signal that travels from the second Port B. In other words, the WDM demultiplexers 601-1 to 601-(N/2) closest to the first Port A will have a shorter delay in the first optical signal that travels from the first Port A as compared to the second optical signal that travels from the second Port B at the respective ring resonator 103-1 to 103-(N/2) location along the optical waveguide 602. Therefore, it is possible to substantially equalize the arrival timing of the first optical signal (that travels from the first Port A) and the second optical signal (that travels from the second Port B) at the photodetector 115-1 to 115-(N/2) by implementing just the optical signal delay $D_{1A}$ to $D_{(N/2)A}$, respectively, without implementing the optical signal delay $D_{1B}$ to $D_{(N/2)B}$, respectively. It should be appreciated that by not implementing the optical signal delays $D_{1B}$ to $D_{(N/2)B}$ in the respective WDM demultiplexers 601-1 to 601-(N/2) closest to the first Port A, the footprint of the WDM receiver row 700 on the chip is reduced and the overall complexity and expense of the WDM receiver row 700 is reduced.

Similarly, because of the time required for the light to travel down the optical waveguide 602, the second half of the WDM demultiplexers 601-[(N/2)+1] to 601-N closest to the second port B will receive the second optical signal that travels from the second Port B before it receives the first optical signal that travels from the first Port A. In other words, the WDM demultiplexers 601-[(N/2)+1] to 601-N closest to the second Port B will have a shorter delay in the second optical signal that travels from the second Port B as compared to the first optical signal that travels from the first Port A at the respective ring resonator 103-[(N/2)+1] to 103-N location along the optical waveguide 602. Therefore, it is possible to substantially equalize the arrival timing of the first optical signal (that travels from the first Port A) and the second optical signal (that travels from the second Port B) at the photodetector 115-[(N/2)+1] to 115-N by implementing just the optical signal delay $D_{[(N/2)+1]B}$ to $D_{NB}$, respectively, without implementing the optical signal delay $D_{[(N/2)+1]A}$ to $D_{NA}$, respectively. It should be appreciated that by not implementing the optical signal delays $D_{[(N/2)+1]A}$ to $D_{NA}$ in the respective WDM demultiplexers 601-[(N/2)+1] to 601-N closest to the second Port B, the footprint of the WDM receiver row 700 on the chip is reduced and the overall complexity and expense of the WDM receiver row 700 is reduced.

The optical signal timing delay equalization condition at a given photodetector 115-$k$ of the photodetectors 115-1 to 115-N in the WDM receiver row 600, 700 is given by Equation 1.

$$\tau_{AB} + D_A + \left(\frac{\sum_{x=0}^{k-1} L_x}{V_g}\right) + D_{kA} = D_B + \left(\frac{\sum_{x=k}^{N-1} L_x}{V_g}\right) + D_{kB}, \quad \text{Equation 1}$$

where $L_0 = 0$.

The differential time delay $\tau_{AB}$ is the time differential between the arrival of the first optical signal at Port A and arrival of the second optical signal at Port B. Therefore, the differential time delay $\tau_{AB}$ is the differential time delay that exists between the first optical signal leaving Port A and the second optical signal leaving Port B. The term $D_A$ is the time required for the first optical signal to travel from Port A to the WDM receiver row 600, 700. The term $D_B$ is the time required for the second optical signal to travel from Port B to the WDM receiver row 600, 700. The term $L_x$ is the length along the WDM receiver row 600, 700 between the WDM demultiplexer 601-$x$ and the next WDM demultiplexer 601-($x$+1). Therefore, the term $L_x$ is the length of the optical waveguide 602 between the reference optical coupling location of the ring resonator 103-$x$ of the WDM demultiplexer 601-$x$ and the reference optical coupling location of the ring resonator 103-($x$+1) of the WDM demultiplexer 601-($x$+1), where the reference optical coupling location of a given ring resonator 601-1 to 601-N is the location along the optical waveguide 602 at which the given ring resonator 601-1 to 601-N is closest to the optical waveguide 602. The term $D_{kA}$ is the time that it takes for the first optical signal that is traveling from Port A to travel from the point at which the first optical signal couples into the ring resonator 103-$k$ of the $k^{th}$ WDM demultiplexer 601-$k$ to the photodetector 115-$k$ of the $k^{th}$ WDM demultiplexer 601-$k$. The term $D_{kB}$ is the time that it takes for the second optical signal that is traveling from Port B to travel from the point at which the second optical signal couples into the ring resonator 103-$k$ of the $k^{th}$ WDM demultiplexer 601-$k$ to the photodetector 115-$k$ of the $k^{th}$ WDM demultiplexer 601-$k$.

Equation 1 represents the condition in which the first optical signal that travels through Port A and the second optical signal that travels through Port B arrive at the photodetector 115-$k$ of the $k^{th}$ WDM demultiplexer 601-$k$ at substantially the same time. Because the first optical signal that travels through Port A and the second optical signal that travels through Port B correspond to respective portions of the same original incoming optical signal, Equation 1 represents the condition in which each portion of the same original incoming optical signal arrives at the photodetector 115-$k$ of the $k^{th}$ WDM demultiplexer 601-$k$ at substantially the same time. Because Equation 1 defines the optical signal timing delay equalization condition for the $k^{th}$ WDM demultiplexer 601-$k$, consideration of Equation 1 for each of the WDM demultiplexers 601-1 to 601-N defines a linear system of N equations that describes the delay-equalization condition of the WDM receiver row 600, 700.

Equation 2 is obtained by subtracting Equation 1 for the $k^{th}$ WDM demultiplexer 601-$k$ from Equation 1 for the (k+1)th WDM demultiplexer 601-($k$+1). Equation 2 can be rewritten as shown in Equation 3. Equation 3 can be rewritten as shown in Equation 4.

$$\frac{L_k}{V_g} + D_{(k+1)A} - D_{kA} = \frac{-L_k}{V_g} + D_{(k+1)B} - D_{kB} \quad \text{Equation 2}$$

$$(D_{(k+1)B} - D_{(k+1)A}) - (D_{kB} - D_{kA}) = \frac{2L_k}{V_g} \quad \text{Equation 3}$$

$$\Delta D_{(k+1)} - \Delta D_k = \frac{2L_k}{V_g} \quad \text{Equation 4}$$

The term $\Delta D_{(k+1)}$ is the difference in travel time of the second optical signal and the first optical signal through the (k+1)th WDM demultiplexer 601-($k$+1) (from the reference optical coupling location of the ring resonator 103-($k$+1) to the photodetector 115-($k$+1)), where the second optical signal is traveling from Port B and the first optical signal is travelling from Port A. The term $\Delta D_k$ is the difference in travel time of the second optical signal and the first optical signal through the $k^{th}$ WDM demultiplexer 601-$k$ (from the reference optical coupling location of the ring resonator 103-$k$ to the photodetector 115-$k$), where the second optical signal is traveling from Port B and the first optical signal is travelling from Port A.

Equation 4 shows that in order to have optical signal timing delay equalization at the photodetector 115-($k$+1) of the (k+1)th WDM demultiplexer 601-($k$+1), the optical signal timing delay differential implemented within the (k+1)th WDM demultiplexer 601-($k$+1), i.e., $\Delta D_{(k+1)}$, should be longer than the optical signal timing delay differential implemented within the $k^{th}$ WDM demultiplexer 601-$k$, i.e., $\Delta D_k$, by an amount that is twice the time required for optical signal propagation through the portion of the optical waveguide 602 that separates the reference optical coupling location of the ring resonator 103-($k$+1) and the reference optical coupling location of the ring resonator 103-$k$. In other words, in order to have the first optical signal that is travelling from Port A and the second optical signal that is travelling from Port B arrive at the photodetector 115-(k+1) of the (k+1)th WDM demultiplexer 601-(k+1) at substantially the same time, the optical signal timing delay differential implemented within the (k+1)th WDM demultiplexer 601-(k+1), i.e., $\Delta D_{(k+1)}$, should be longer than the optical signal timing delay differential implemented within the $k^{th}$ WDM demultiplexer 601-k, i.e., $\Delta D_k$, by an amount that is twice the time required for light to travel through the portion of the optical waveguide 602 that separates the (k+1)th WDM demultiplexer 601-(k+1) from the $k^{th}$ WDM demultiplexer 601-k. For example, in the WDM receiver row 600, in order to have the first optical signal that is travelling from Port A and the second optical signal that is travelling from Port B arrive at the photodetector 115-2 of the WDM demultiplexer 601-2 at substantially the same time, the optical signal timing delay differential implemented within the WDM demultiplexer 601-2, i.e., $(D_{2B}-D_{2A})$, should be longer than the optical signal timing delay differential implemented within the WDM demultiplexer 601-1, i.e., $(D_{1B}-D_{1A})$, by an amount that is twice the time required for light to travel through the $L_1$ portion of the optical waveguide 602 that separates the reference optical coupling location of the ring resonator 103-2 of the WDM demultiplexer 601-2 from the reference optical coupling location of the ring resonator 103-1 of the WDM demultiplexer 601-1. Also, by way of example, in the WDM receiver row 700, in order to have the first optical signal that is travelling from Port A and the second optical signal that is travelling from Port B arrive at the photodetector 115-2 of the WDM demultiplexer 601-2 at the same time, the optical signal timing delay differential implemented within the WDM demultiplexer 601-2, i.e., $D_{2A}$, should be longer than the optical signal timing delay differential implemented within the WDM demultiplexer 601-1, i.e., $D_{1A}$, by an amount that is twice the time required for light to travel through the $L_1$ portion of the optical waveguide 602 that separates the reference optical coupling location of the ring resonator 103-2 of the WDM demultiplexer 601-2 from the reference optical coupling location of the ring resonator 103-1 of the WDM demultiplexer 601-1.

In some embodiments, the WDM receiver row 600, 700 is formed in a substantially symmetrical manner. For example, in some embodiments, the number N of WDM demultiplexers 601-1 to 601-N is an even integer value with WDM demultiplexers 601-1 to 601-(N/2) positioned along a first half of the WDM receiver row 600, 700, and with WDM demultiplexers 601-[(N/2)+1] to 601-N positioned along a second half of the WDM receiver row 600, 700, where the spacings between adjacently positioned WDM demultiplexers 601-1 to 601-N is substantially mirrored between the first half and the second half of the WDM receiver row 600, 700. Also, by way of example, in some embodiments, the number N of WDM demultiplexers 601-1 to 601-N is an odd integer value greater than 1 with WDM demultiplexers 601-1 to 601-[(N−1)/2] positioned along a first half of the WDM receiver row 600, 700, and with WDM demultiplexer 601-[(N+1)/2] positioned at the center of the WDM receiver row 600, 700, and with WDM demultiplexers 601-[(N+3)/2] to 601-N positioned along a second half of the WDM receiver row 600, 700, where the spacings between adjacently positioned WDM demultiplexers 601-1 to 601-N is substantially mirrored between the first half and the second half of the WDM receiver row 600, 700.

In such embodiments where the WDM receiver row 600, 700 is formed in a substantially symmetrical manner, the distance $L_1$ along the optical waveguide 602 is substantially equal to the distance $L_{N-1}$ along the optical waveguide 602, and the distance $L_2$ along the optical waveguide 602 is substantially equal to the distance $L_{N-2}$ along the optical waveguide 602, and so on. In these embodiments, in order to have optical signal timing delay equalization at the each of the photodetectors 115-1 to 115-N of the WDM demultiplexers 601-1 to 601-N, the optical signal timing delay differentials implemented within the WDM demultiplexers 601-1 to 601-N is substantially mirrored between the first half and the second half of the WDM receiver row 600, 700. For example, with regard to the WDM receiver row 600, the optical signal timing delay differential implemented within the WDM demultiplexer 601-1, i.e., $(\Delta D_1 = D_{1B} - D_{1A})$, is substantially equal to the optical signal timing delay differential implemented within the WDM demultiplexer 601-N, i.e., $(\Delta D_N = D_{NB} - D_{NA})$, and the optical signal timing delay differential implemented within the WDM demultiplexer 601-2, i.e., $(\Delta D_2 = D_{2B} - D_{2A})$, is substantially equal to the optical signal timing delay differential implemented within the WDM demultiplexer 601-N, i.e., $(\Delta D_{(N-1)} = D_{(N-1)B} - D_{(N-1)A})$, and so on. Also, by way of example, with regard to the WDM receiver row 700, the optical signal timing delay differential implemented within the WDM demultiplexer 601-1, i.e., $D_{1A}$, is substantially equal to the optical signal timing delay differential implemented within the WDM demultiplexer 601-N, i.e., $D_{NB}$, and the optical signal timing delay differential implemented within the WDM demultiplexer 601-2, i.e., $D_{2A}$, is substantially equal to the optical signal timing delay differential implemented within the WDM demultiplexer 601-N, i.e., $D_{(N-1)B}$, and so on.

Figure 8A:
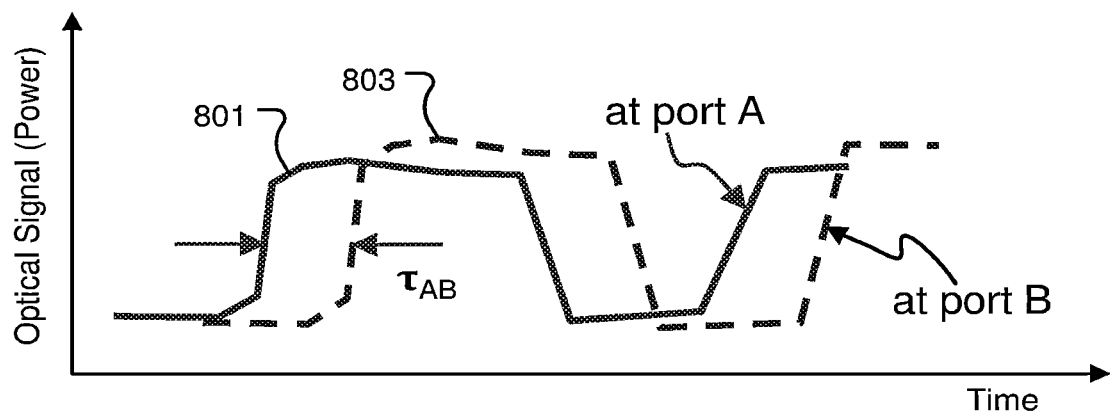
FIG. 8A shows an example temporal plot of optical power of the first optical signal that travels from Port A and the second optical signal that travels from Port B, in accordance with some embodiments.

FIG. 8A shows an example temporal plot of optical power of the first optical signal that travels from Port A and the second optical signal that travels from Port B, in accordance with some embodiments. A curve 801 represents the optical power as a function of time of the first optical signal that travels from Port A. A curve 803 represents the optical power as a function of time of the second optical signal that travels from Port B. The first optical signal 801 that travels from Port A and the second optical signal 803 that travels from Port B are respective portions of a same original optical signal that is received at the electro-optic receiver device. In some embodiments, the first optical signal 801 and the second optical signal 803 correspond to different polarizations of light included within the original optical signal. In some embodiments, a first polarization of light within the original optical signal is separated (split) from the original optical signal and is transmitted through the first Port A as the first optical signal 801 maintaining the first polarization. Also, in these embodiments, a second polarization of light within the original optical signal is separated (split) from the original optical signal and is polarization-rotated from the second polarization to the first polarization to create the second optical signal 803 that is transmitted through the second Port B. Therefore, in these embodiments, the first optical signal 801 that travels from Port A and the second optical signal 803 that travels from Port B have the same polarization (first polarization). This allows the WDM demultiplexers 601-1 to 601-N within the WDM receiver row 600, 700 to be configured and optimized for handling light having the first polarization, which provides for processing of both the first optical signal 801 and the second optical signal 803 that collectively represent an entirety of the original optical signal, without having to process light having the second polarization. However, the optical splitting and polarization-rotation that is done to separate and create the first optical signal 801 and the second optical signal 803 from the original optical signal introduces the differential time delay ($\tau_{AB}$) that exists between the first optical signal leaving Port A and the second optical signal leaving Port B.

Figure 8B:
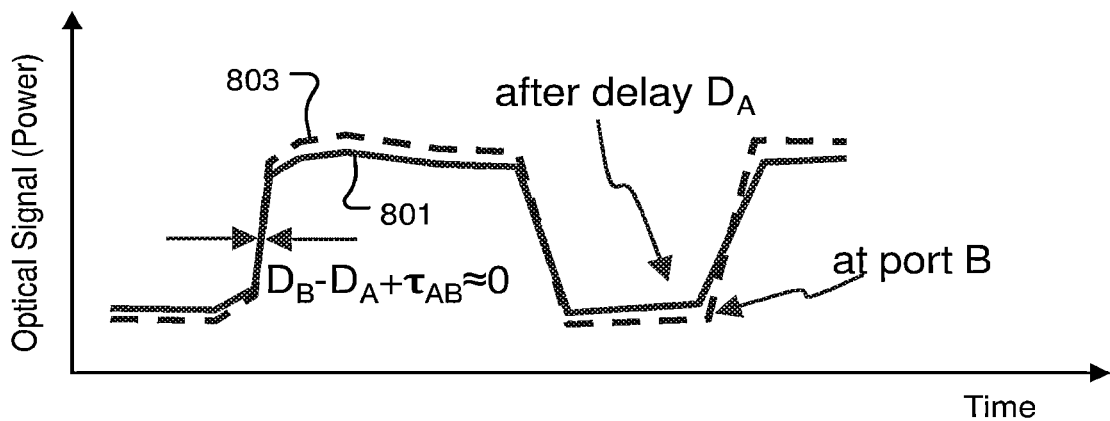
FIG. 8B shows an example temporal plot of optical power of the first optical signal that travels from Port A and the second optical signal that travels from Port B with implementation of delay DA or delays DA and DB to mitigate the differential time delay ($\tau\_AB$), in accordance with some embodiments.

FIG. 8B shows an example temporal plot of optical power of the first optical signal that travels from Port A and the second optical signal that travels from Port B with implementation of delay $D_A$ or delays $D_A$ and $D_B$ to mitigate the differential time delay ($\tau_{AB}$), in accordance with some embodiments. As discussed with regard to Equation 1, the delay $D_A$ is the time required for the first optical signal 801 to travel from Port A of the PSR to the WDM receiver row 600, 700, and the delay $D_B$ is the time required for the second optical signal 803 to travel from Port B of the PSR to the WDM receiver row 600, 700. The magnitude of the delay $D_A$ is controlled by adding optical delay on the optical travel path between the first Port A of the PSR and the WDM receiver row 600, 700. Similarly, the magnitude of the delay $D_B$ is controlled by adding optical delay on the optical travel path between the second Port B of the PSR and the WDM receiver row 600, 700. When the difference between the delay $D_A$ and the delay $D_B$ is substantially equal to the differential time delay ($\tau_{AB}$), the first optical signal that travels from Port A and the second optical signal that travels from Port B will arrive at the WDM receiver row 600, 700 at substantially the same time. This condition is represented by Equation 5.

$$D_A - D_B = \tau_{AB} \qquad \text{Equation 5:}$$

The magnitudes of the delays $D_A$ and $D_B$ can be set and used to offset the differential time delay ($\tau_{AB}$) between the first optical signal and the second optical signal at Ports A and B, respectively, of the PSR. Setting and using the delays $D_A$ and $D_B$ to offset the differential time delay ($\tau_{AB}$) between the first optical signal and the second optical signal at Ports A and B, respectively, of the PSR provides for minimization of the optical signal timing delay differential $\Delta D_k$ (where $\Delta D_k = D_{kB} - D_{kA}$) that has to be implemented within the $k^{th}$ WDM demultiplexer 601-$k$ (where k is any one of 1 to N) in order to have the first optical signal 801 and the second optical signal 803 arrive substantially simultaneously at the photodetector 115-$k$ of the $k^{th}$ WDM demultiplexer 601-$k$, particularly when the WDM receiver row 600, 700 is configured in a substantially symmetric manner. When the condition of Equation 5 exists, Equation 1 simplifies to the optical signal timing delay equalization condition shown by Equation 6. Equation 6 can be rewritten as shown in Equation 7, which expresses that the optical signal timing delay differential $\Delta D_k$ needed within the $k^{th}$ WDM demultiplexer 601-$k$ is substantially equal to the difference between the time required for the first optical signal from Port A to travel along the optical waveguide 602 from the delay $D_A$ to the $k^{th}$ WDM demultiplexer 601-$k$ and the time required for the second optical signal from Port B to travel along the optical waveguide 602 from the delay $D_B$ to the $k^{th}$ WDM demultiplexer 601-$k$. In general, the optical signal timing delay differential $\Delta D_k$ needed within the $k^{th}$ WDM demultiplexer 601-$k$ is equal to the accumulated delay in the second optical signal arriving at the $k^{th}$ WDM demultiplexer 601-$k$ from the second Port B of the PSR minus the accumulated delay in the first optical signal arriving at the $k^{th}$ WDM demultiplexer 601-$k$ from the first Port A of the PSR.

$$\left(\frac{\sum_{x=0}^{k-1} L_x}{V_g}\right) + D_{kA} = \left(\frac{\sum_{x=k}^{N-1} L_x}{V_g}\right) + D_{kB}, \text{ where } L_0 = 0. \qquad \text{Equation 6}$$

-continued $$\Delta D_k = D_{kB} - D_{kA} = \left(\frac{\sum_{x=0}^{k-1} L_x}{V_g}\right) - \left(\frac{\sum_{x=k}^{N-1} L_x}{V_g}\right), \text{ where } L_0 = 0. \qquad \text{Equation 7}$$

The optical signal timing delay differential $\Delta D_k$ needed within a given one ($k^{th}$) the WDM demultiplexers 601-1 to 601-N located near the center of the WDM receiver row 600, 700 is less than the optical signal timing delay differential $\Delta D_{k'}$ needed within a given one ($k'^{th}$) the WDM demultiplexers 601-1 to 601-N located near the end of the WDM receiver row 600, 700. This is because a difference between the sum of the lengths $L_1$ to $L_{(k-1)}$ along the optical waveguide 602 from the delay $D_A$ to the $k^{th}$ WDM demultiplexer 601-$k$ and the sum of the lengths $L_k$ to $L_{(N-1)}$ along the optical waveguide 602 from the delay $D_B$ to the $k^{th}$ WDM demultiplexer 601-$k$, becomes smaller when the $k^{th}$ WDM demultiplexer 601-$k$ is located near the center of the WDM receiver row 600, 700. Also, in some embodiments, the number N of WDM demultiplexers 601-1 to 601-N is an odd number (an odd integer value). In some embodiments, when the number N of WDM demultiplexers 601-1 to 601-N is an odd integer number greater than 1 and the WDM receiver row 600, 700 is configured in a substantially symmetric manner, the center positioned WDM demultiplexer 601-[(N+1)/2] is implemented with an optical signal timing delay differential $\Delta D_{[(N+1)/2]}$ of essentially zero, i.e., $D_{[(N+1)/2]B} = D_{[(N+1)/2]A} = 0$.

Figure 9A:
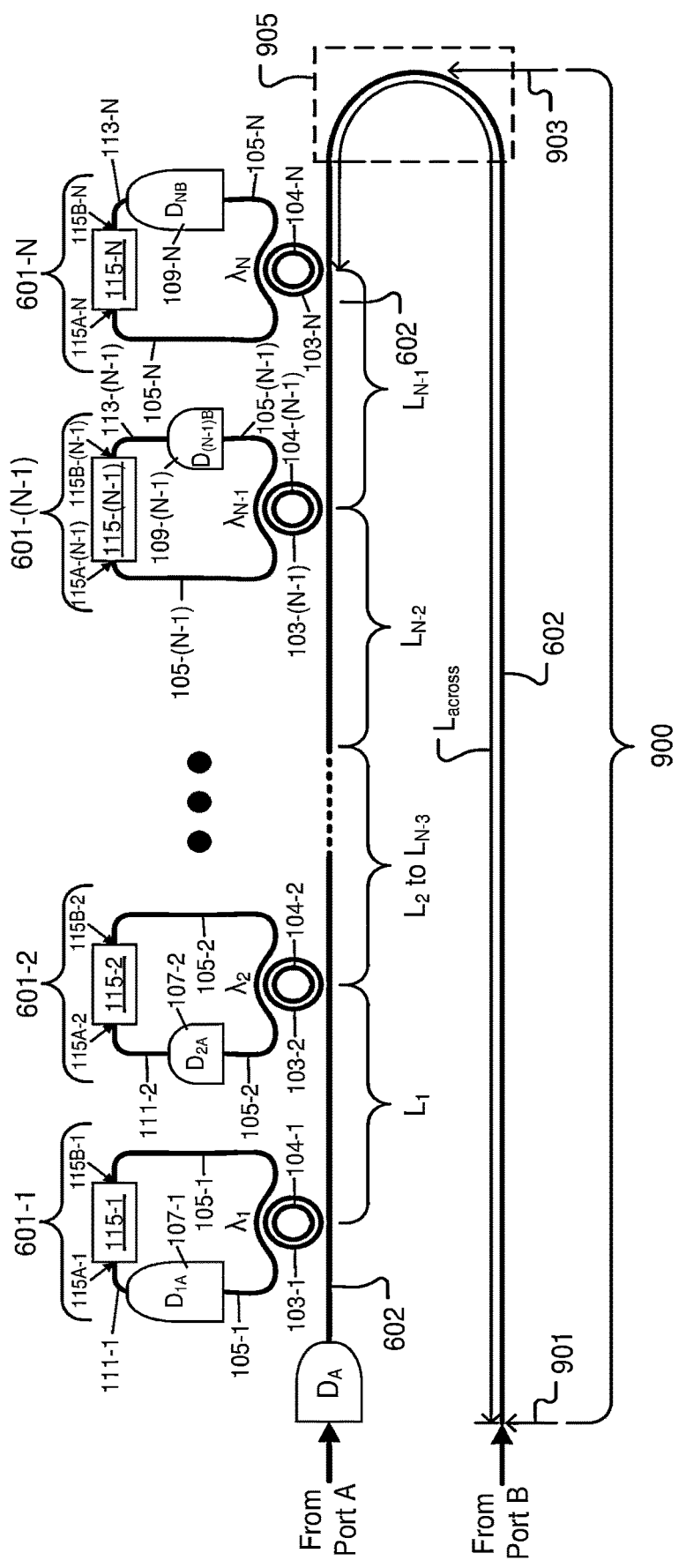
FIG. 9A shows a WDM receiver row, in accordance with some embodiments.

FIG. 9A shows a WDM receiver row 900, in accordance with some embodiments. The WDM receiver row 900 is implemented in a similar manner as the WDM receiver row 700 of FIG. 7, with the optical waveguide 602 having a U-shape, such that both the first optical signal that travels from Port A of the PSR and the second optical signal that travels from Port B of the PSR enter from a same side 901 of the WDM receiver row 900. Specifically, the optical waveguide 602 includes the U-shaped section 905 at a side 903 of the WDM receiver row 900 opposite from the side 901 of the WDM receiver row 900 where both the first optical signal that travels from Port A and the second optical signal that travels from Port B enter. In this manner, the second optical signal that travels from Port B of the PSR travels a distance $L_{across}$ through the optical waveguide 602, including through the U-shaped section 905, to get to the $N^{th}$ WDM demultiplexer 601-N of the WDM receiver row 900. In the WDM receiver row 900, the WDM demultiplexers 601-1 to 601-N are arranged in a line on one side of the U-shaped optical waveguide 602. In some embodiments, the magnitude of the optical signal delay $D_A$ is set substantially equal to the differential time delay ($\tau_{AB}$), where the differential time delay ($\tau_{AB}$) includes the delay needed for the second optical signal traveling from Port B to travel through the length $L_{across}$ of the optical waveguide 602. More specifically, the optical signal delay $D_A$ is set substantially equal to the differential time delay ($\tau_{AB}$), where the differential time delay ($\tau_{AB}$) includes ($L_{across}/V_g$). In these embodiments, the optical signal delay $D_A$ is about the same amount of time that it takes light to travel through the optical waveguide 602 across the WDM receiver row 900. Therefore, in these embodiments, if the optical signal delay $D_A$ is implemented as an optical waveguide delay line, the length of the optical signal delay line that constitutes the optical signal delay $D_A$ will be large and will contribute significantly to waveguide optical power loss, non-linear optical power loss, congestion of wiring, among other things. In this case, the section of the optical waveguide 602 that conveys the second optical signal from Port B of the PSR across the WDM receiver row 900 to the U-shaped section 905 is referred to as a return waveguide, and the section of the optical waveguide 602 that extends from the optical signal delay $D_A$ past each of the ring resonators 103-1 to 103-N of the WDM demultiplexers 601-1 to 601-N, respectively, is referred to as a main optical signal bus, with the return waveguide and the main optical signal bus being optically connected by the U-shaped section 905 of the optical waveguide 602. In some embodiments, the return waveguide is an substantially straight section of the optical waveguide 602 that extends parallel to the main optical signal bus.

Figure 9B:
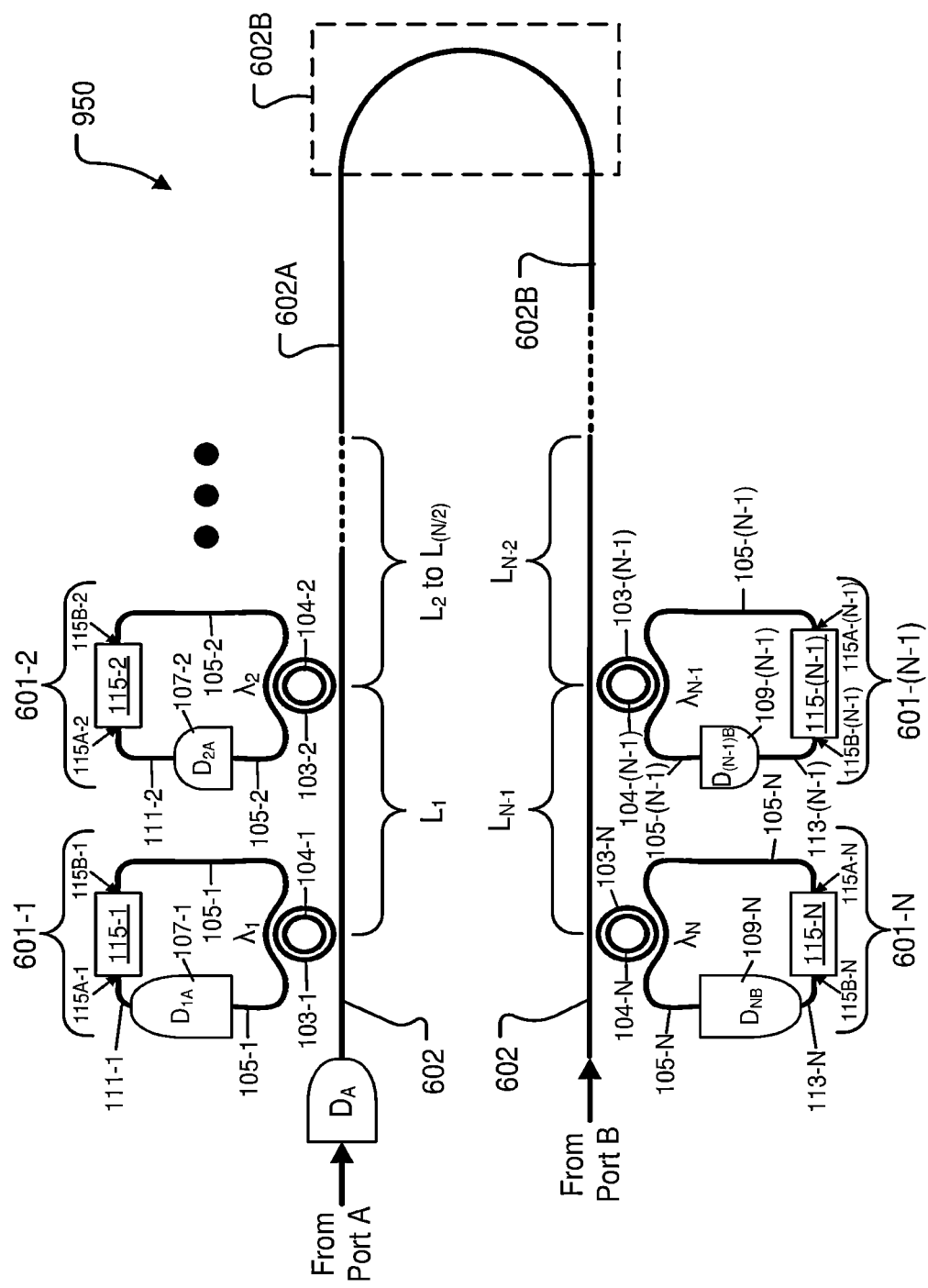
FIG. 9B shows a WDM receiver row, in accordance with some embodiments.

FIG. 9B shows a WDM receiver row 950, in accordance with some embodiments. In the WDM receiver row 950, the optical waveguide 602 is U-shaped and includes a first linear-shaped section 602A, a U-shaped section 602B, and a second linear-shaped section 602C. The first linear-shaped section 602A is optically connected to the second linear-shaped section through the U-shaped section 602B. The WDM receiver row 950 is folded such that half of the WDM demultiplexers 601-1 to 601-(N/2) are positioned along the first linear-shaped section 602A of the optical waveguide 602, and such that half of the WDM demultiplexers 601-[(N/2)+1] to 601-N are positioned along the second linear-shaped section 602C of the optical waveguide 602. In some embodiments, the number N of WDM demultiplexers is an odd integer number, and the middle WDM demultiplexer 601-[(N+1)/2] is positioned along the U-shaped section 602B, with the WDM demultiplexers 601-1 to 601-[(N−1)/2] positioned along the first linear-shaped section 602A of the optical waveguide 602, and with the WDM demultiplexers 601-{[(N+1)/2]+1} positioned along the second linear-shaped section 602C of the optical waveguide 602. In the WDM receiver row 950, both the first optical signal that travels from Port A of the PSR and the second optical signal that travels from Port B of the PSR enter from a same side of the WDM receiver row 950. In some embodiments, both the first optical signal that travels from Port A of the PSR and the second optical signal that travels from Port B of the PSR enter at a side of the WDM receiver row 950 closest to the PSR. In the WDM receiver row 950, the optical signal delay $D_A$ is set substantially equal to the differential time delay $(\tau_{AB})$ between the first optical signal leaving Port A of the PSR and the second optical signal leaving Port B of the PSR. Therefore, the optical signal delay $D_A$ implemented in the WDM receiver row 950 includes a shorter optical signal delay line than what is included in the optical signal delay $D_A$ of the WDM receiver row 900 of FIG. 9A, and therefore contributes less to waveguide optical power loss, non-linear optical power loss, congestion of wiring, among other things.

Figure 10A:
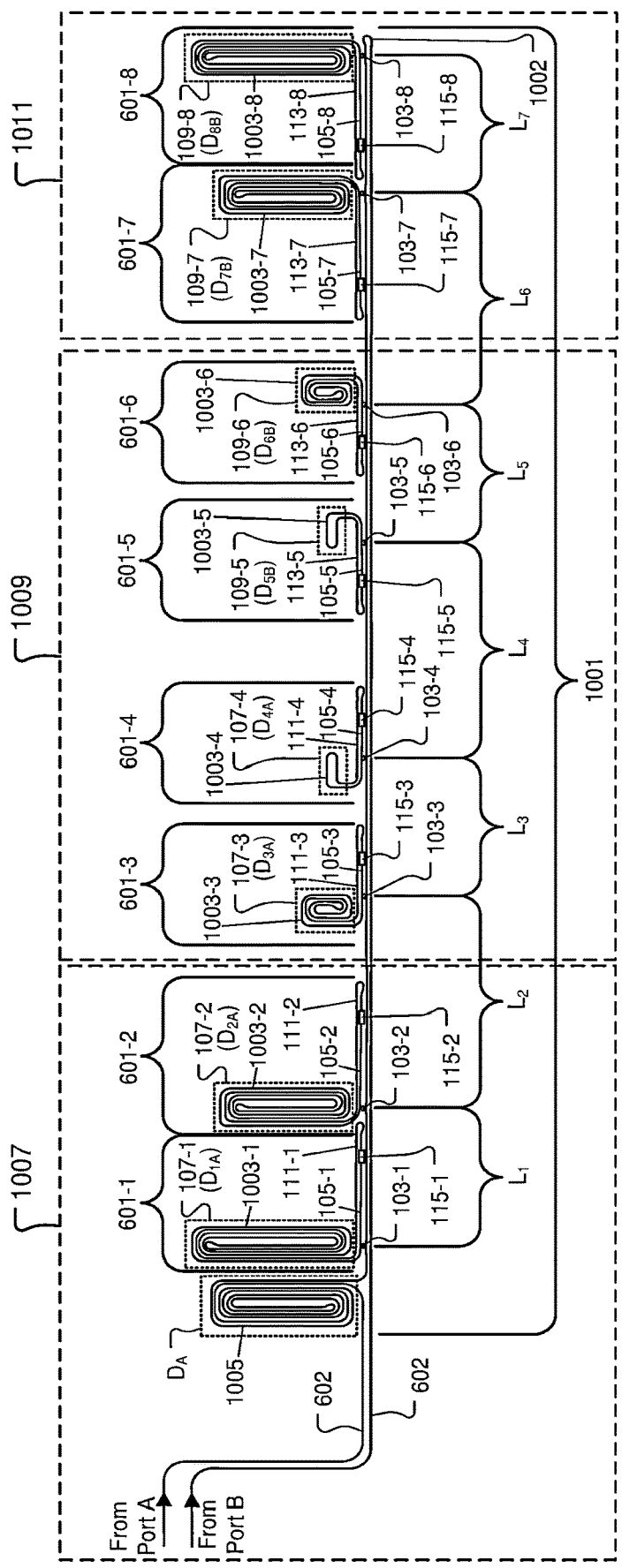
FIG. 10A shows a WDM receiver row that includes eight WDM demultiplexers (eight channels), in accordance with some embodiments.
Figure 10B:
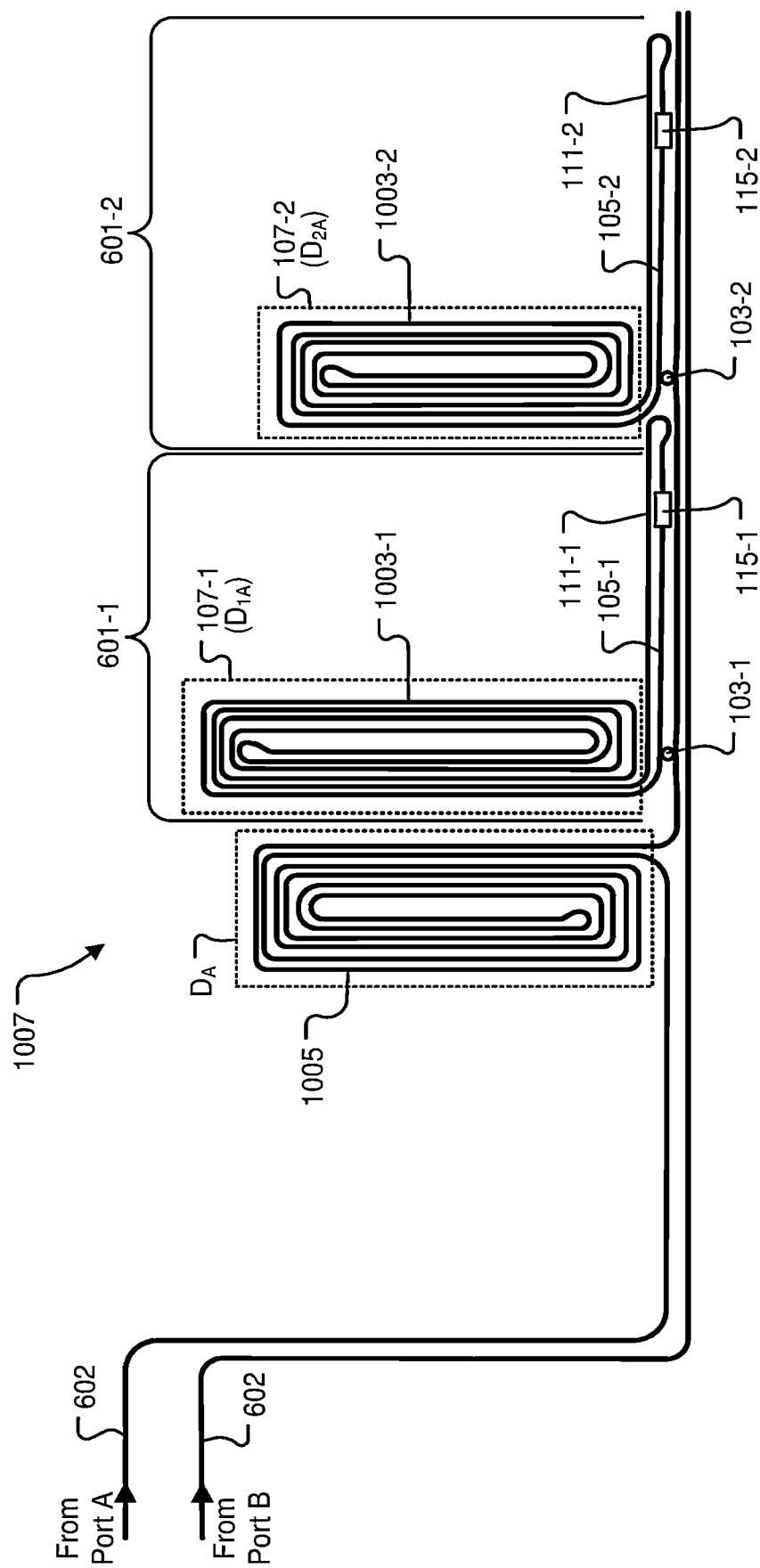
FIG. 10B shows a close-up view of a section of the WDM receiver row of FIG. 10A, in accordance with some embodiments.
Figure 10C:
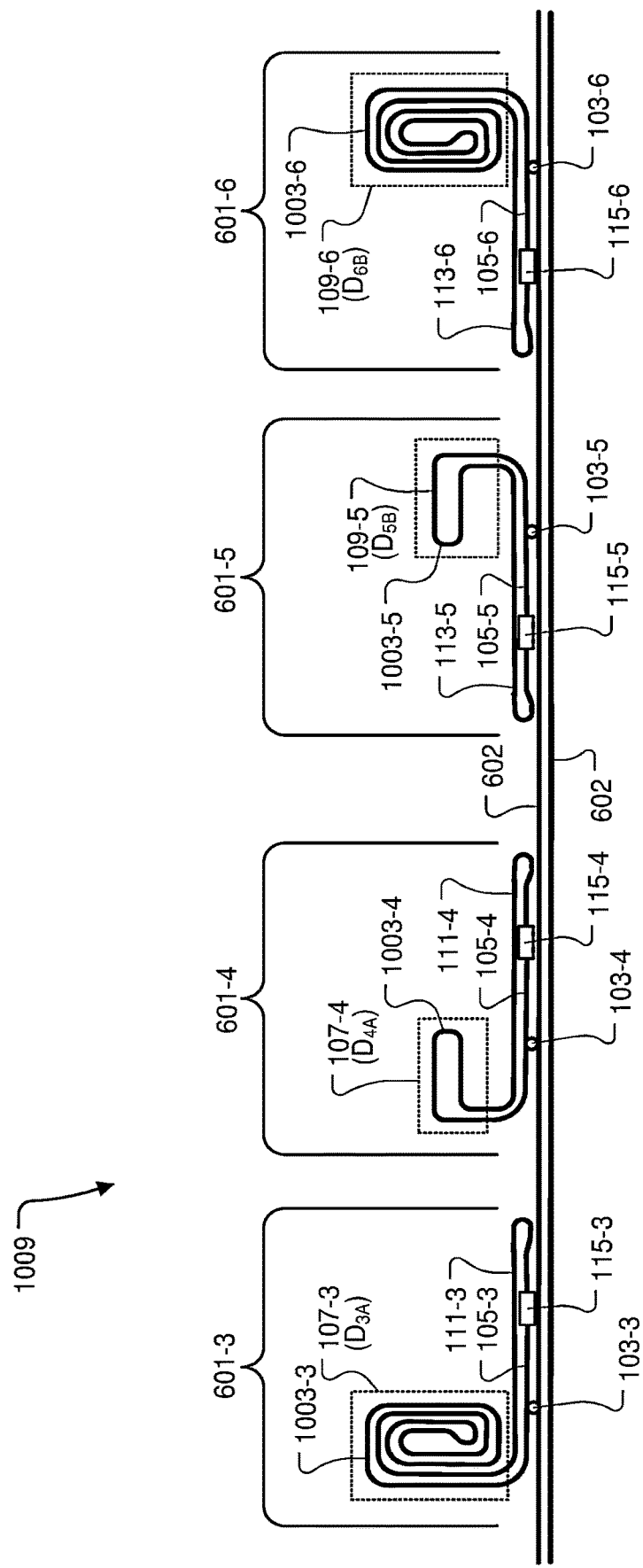
FIG. 10C shows a close-up view of a section of the WDM receiver row of FIG. 10A, in accordance with some embodiments.
Figure 10D:
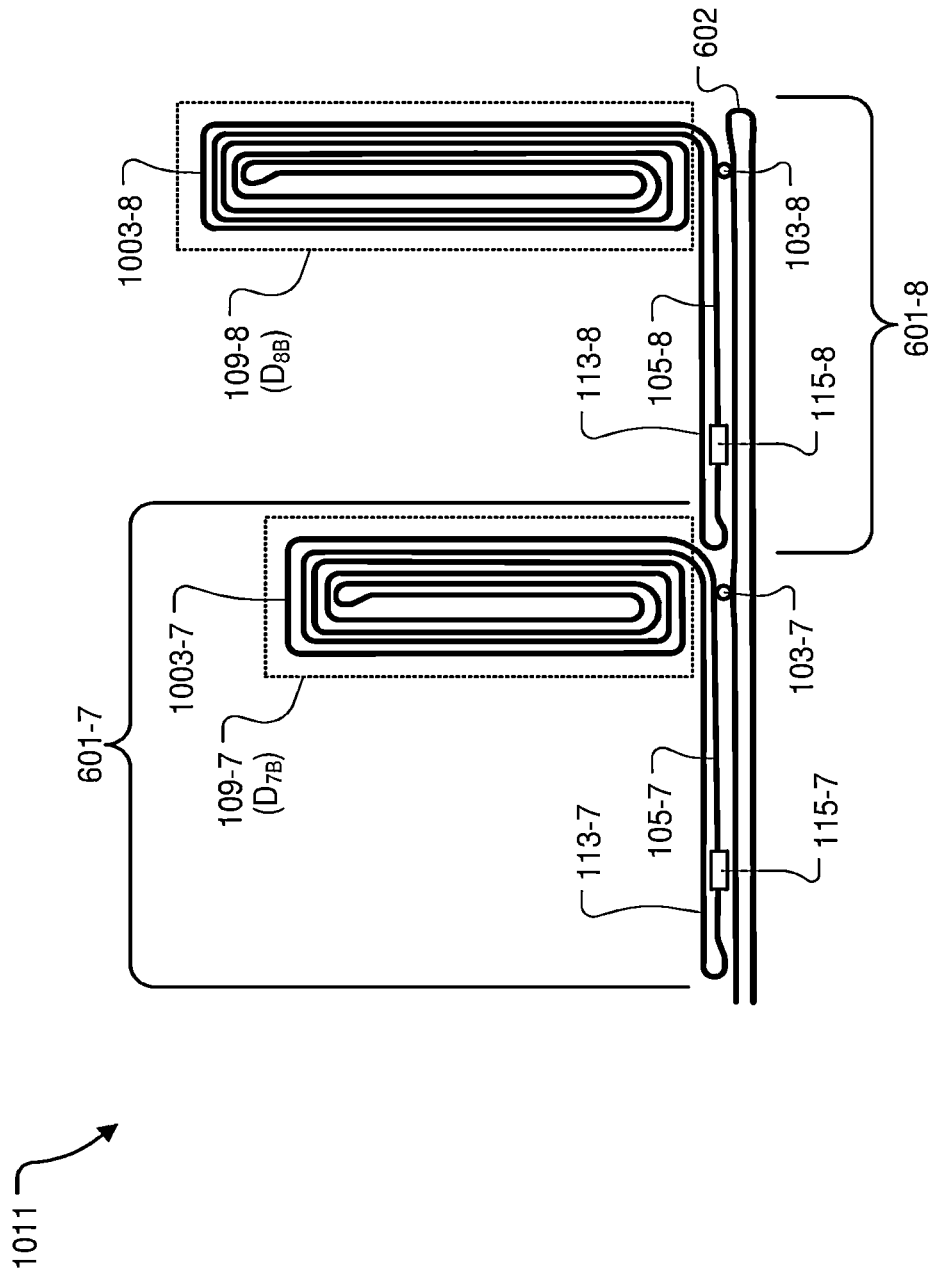
FIG. 10D shows a close-up view of a section of the WDM receiver row of FIG. 10A, in accordance with some embodiments.

FIG. 10A shows a WDM receiver row 1001 that includes eight WDM demultiplexers 601-1 to 601-8 (eight channels), in accordance with some embodiments. FIG. 10B shows a close-up view of a section 1007 of the WDM receiver row 1001, in accordance with some embodiments. FIG. 10C shows a close-up view of a section 1009 of the WDM receiver row 1001, in accordance with some embodiments. FIG. 10D shows a close-up view of a section 1011 of the WDM receiver row 1001, in accordance with some embodiments. The WDM receiver row 1001 is implemented in a similar manner as the WDM receiver row 700 of FIG. 7, with the optical waveguide 602 having a U-shape, such that both the first optical signal that travels from Port A of the PSR and the second optical signal that travels from Port B of the PSR enter from a same side of the WDM receiver row 1001. The optical waveguide 602 includes a U-shaped section 1002 at a side of the WDM receiver row 1001 opposite from the side of the WDM receiver row 1001 where both the first optical signal that travels from Port A and the second optical signal that travels from Port B enter. In this manner, the second optical signal that travels from Port B of the PSR travels a distance $L_{across}$ through the optical waveguide 602, including through the U-shaped section 1002, to get to the $8^{th}$ WDM demultiplexer 601-8 of the WDM receiver row 1001. In the WDM receiver row 1001, the WDM demultiplexers 601-1 to 601-8 are arranged in a line on one side of the U-shaped optical waveguide 602.

The WDM receiver 1001 includes the optical signal delay $D_A$ positioned so that the first optical signal coming from Port A of the PSR has to travel through the optical signal delay $D_A$ before arriving at the $1^{st}$ WDM demultiplexer 601-1. In some embodiments, the magnitude of the optical signal delay $D_A$ is set substantially equal to the differential time delay $(\tau_{AB})$, where the differential time delay $(\tau_{AB})$ includes the delay needed for the second optical signal traveling from Port B to travel through the length $L_{across}$ of the optical waveguide 602. More specifically, the optical signal delay $D_A$ is set substantially equal to the differential time delay $(\tau_{AB})$, where the differential time delay $(\tau_{AB})$ includes $(L_{across}/V_g)$. In the example WDM receiver row 1001, the optical signal delay $D_A$ is configured as a length of optical waveguide 1005 that either forms part of the optical waveguide 602 or is optically connected to the optical waveguide 602. Also, in the example WDM receiver row 1001, the optical signal delay $D_A$ is configured to have one or more of a folded shape, a convoluted shape, a spiral shape, a loop shape, and a zig-zag shape, among other shapes, so as to reduce/minimize the chip area occupied by the optical signal delay $D_A$.

The first half of the WDM demultiplexers 601-1 to 601-4 includes the first optical signal timing delay section 107-1 to 107-4, respectively, but does not include the second optical signal timing delay section 109-1 to 109-4, respectively. The second half of the WDM demultiplexers 601-5 to 601-8 includes the second optical signal timing delay section 109-5 to 109-8, respectively, but does not include the first optical signal timing delay section 107-5 to 107-8, respectively. The first half of the WDM demultiplexers 601-1 to 601-4 and the second half of the WDM demultiplexers 601-5 to 601-8 are configured in a symmetric manner, such that the WDM receiver row 1001 is mirrored about its midpoint (with the exception of the optical signal delay $D_A$). Specifically, the first optical signal timing delay section 107-1 and the second optical signal timing delay section 109-8 have the substantially same configuration and provide substantially the same amount of optical signal timing delay. Also, the first optical signal timing delay section 107-2 and the second optical signal timing delay section 109-7 have the substantially same configuration and provide substantially the same amount of optical signal timing delay. Also, the first optical signal timing delay section 107-3 and the second optical signal timing delay section 109-6 have the substantially same configuration and provide substantially the same amount of optical signal timing delay. Also, the first optical signal timing delay section 107-4 and the second optical signal timing delay section 109-5 have the substantially same configuration and provide substantially the same amount of optical signal timing delay.

Additionally, each of the first optical signal timing delay sections 107-1 to 107-4 and each of the second optical signal timing delay sections 109-5 to 109-8 is configured to have one or more of a folded shape, a convoluted shape, a spiral shape, a loop shape, and a zig-zag shape, among other shapes, so as to reduce/minimize the chip area that it occupies. The amount of optical signal timing delay provided by the first optical signal timing delay sections 107-1 to 107-4 decreases monotonically in the direction extending from the outside of the WDM receiver row 1001 to the midpoint of the WDM receiver row 1001. The midpoint of the WDM receiver row 1001 is the location along the optical waveguide 602 half way between the ring resonator 103-4 of the WDM demultiplexer 601-4 and the ring resonator 103-5 of the WDM demultiplexer 601-5. Similarly, the amount of optical signal timing delay provided by the second optical signal timing delay sections 107-5 to 107-8 decreases monotonically in the direction extending from the outside of the WDM receiver row 1001 to the midpoint of the WDM receiver row 1001. In the WDM receiver row 1001, the amount of optical signal timing delay provided by the $k^{th}$ one of the first optical signal timing delay sections 107-k is substantially equal to the magnitude (absolute value) of the optical signal timing delay differential $\Delta D_k$ given by Equation 7, for N=8. Also, in the WDM receiver row 1001, the amount of optical signal timing delay provided by the $k^{th}$ one of the second optical signal timing delay sections 109-k is substantially equal to the magnitude (absolute value) of the optical signal timing delay differential $\Delta D_k$ given by Equation 7, for N=8.

In some embodiments, photodiodes are connected to on-chip receiver circuits, such as a transimpedance amplifier (TIA). When closely integrating photonics and circuits, there is an issue that photonic waveguides and devices should be kept away from circuit wires (conductive structures) to avoid metal induced optical losses, such as light absorption or light scattering. Also, in some situations, use of long optical delay lines potentially block large chip areas that might otherwise be used for circuit wiring. The WDM receiver row 1001 addresses the above-mentioned issues by having each of the first optical signal timing delay sections 107-1 to 107-4 positioned outward from its corresponding photodetector 115-1 to 115-4, respectively, and by having each of the second optical signal timing delay sections 109-5 to 109-8 positioned outward from its corresponding photodetector 115-5 to 115-8, respectively. Specifically, each of the photodetectors 115-1 to 115-4 is connected to the first optical signal timing delay section 107-1 to 107-4, respectively, that is positioned to the left (outward relative to the midpoint of the WDM receiver row 1001). And, each of the photodetectors 115-5 to 115-8 is connected to the second optical signal timing delay section 109-5 to 109-8, respectively, that is positioned to the right (outward relative to the midpoint of the WDM receiver row 1001). In some embodiments, in the WDM receiver row 1001, the outermost first optical signal timing delay section 107-1 and the outermost second optical signal timing delay section 109-8 are positioned outside of the main circuit area, which minimizes the impact of optical signal delay lines on circuit placement.

Figure 11A:
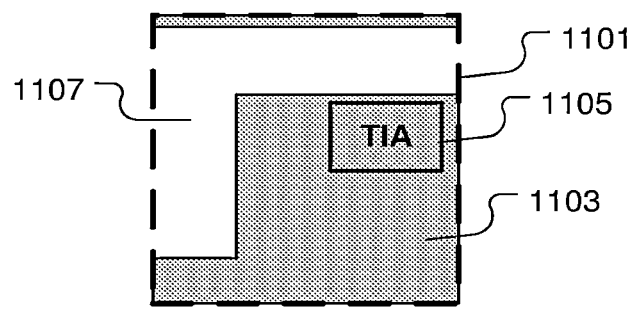
FIG. 11A shows a floorplan of a receiver circuit unit cell for use in configuring a WDM receiver row, in accordance with some embodiments.

FIG. 11A shows a floorplan of a receiver circuit unit cell 1101 for use in configuring a WDM receiver row, in accordance with some embodiments. The floorplan of the receiver circuit unit cell 1101 includes an area 1101 (shaded area) available for implementation of integrated circuitry. In some embodiments, TIA circuitry 105 is implemented within the area 1101. The floorplan of the receiver circuit unit cell 1101 also includes an area 1107 (unshaded area) available for implementation of photonics components. Placement of electronic circuitry within the area 1107 is limited to ensure that optical interactions between photonics components and electronic components are acceptable.

Figure 11B:
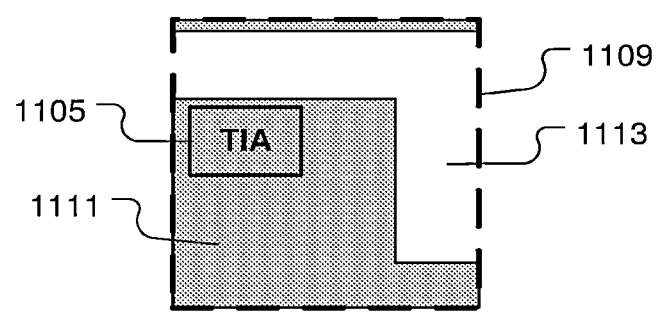
FIG. 11B shows a floorplan of another receiver circuit unit cell for use in configuring a WDM receiver row, in accordance with some embodiments.

FIG. 11B shows a floorplan of a receiver circuit unit cell 1109 for use in configuring a WDM receiver row, in accordance with some embodiments. The floorplan of the receiver circuit unit cell 1109 is a horizontally-flipped (reflected) version of the floorplan of the receiver circuit unit cell 1101. The floorplan of the receiver circuit unit cell 1109 includes an area 1111 (shaded area) available for implementation of integrated circuitry. In some embodiments, TIA circuitry 105 is implemented within the area 1111. The floorplan of the receiver circuit unit cell 1109 also includes an area 1113 (unshaded area) available for implementation of photonics components. Placement of electronic circuitry within the area 1113 is limited to ensure that optical interactions between photonics components and electronic components are acceptable.

Figure 11C:
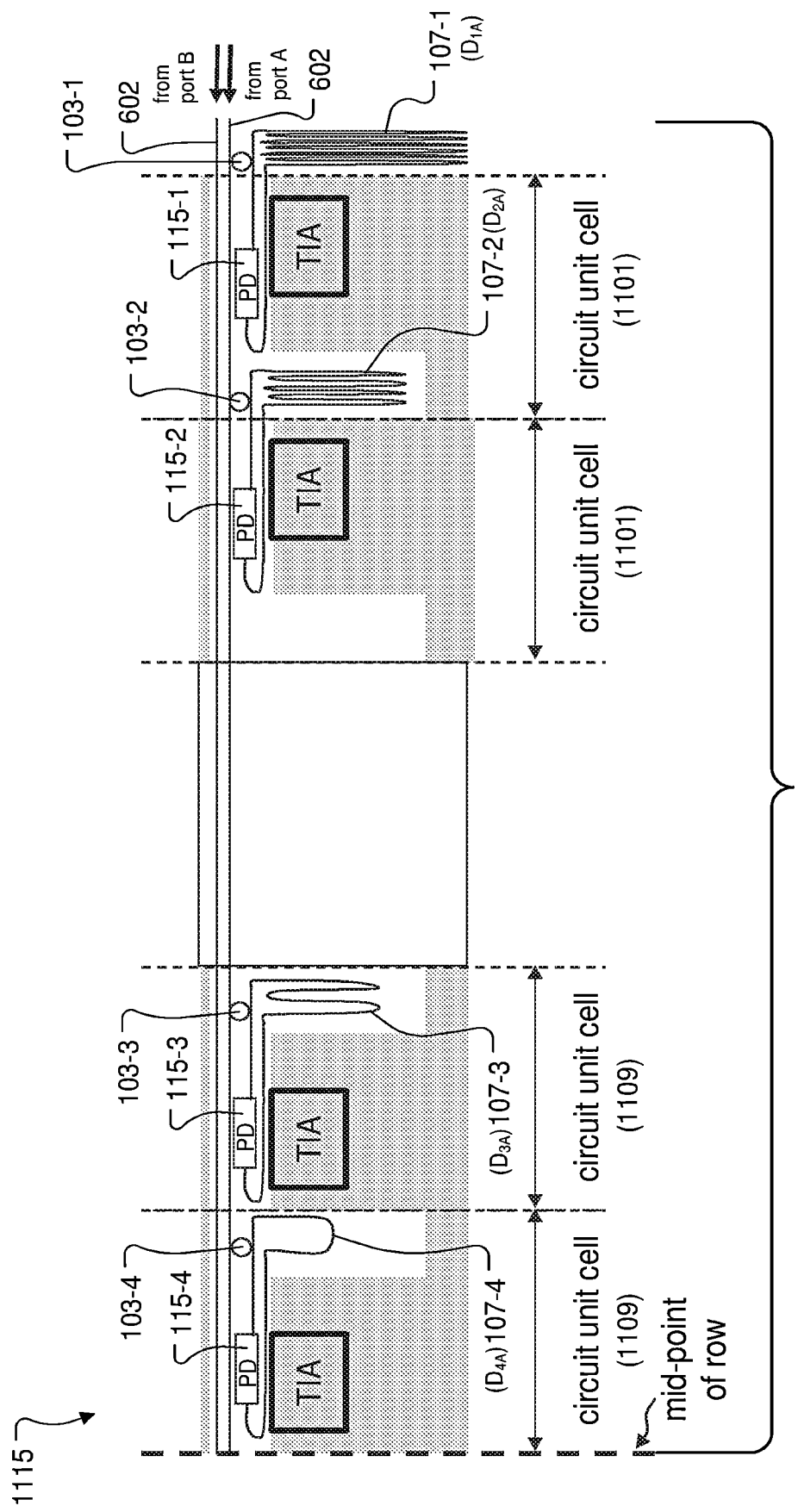
FIG. 11C shows a first half of a WDM receiver row implemented using the receiver circuit unit cells of FIGS. 11A and 11B, in accordance with some embodiments.
Figure 11D:
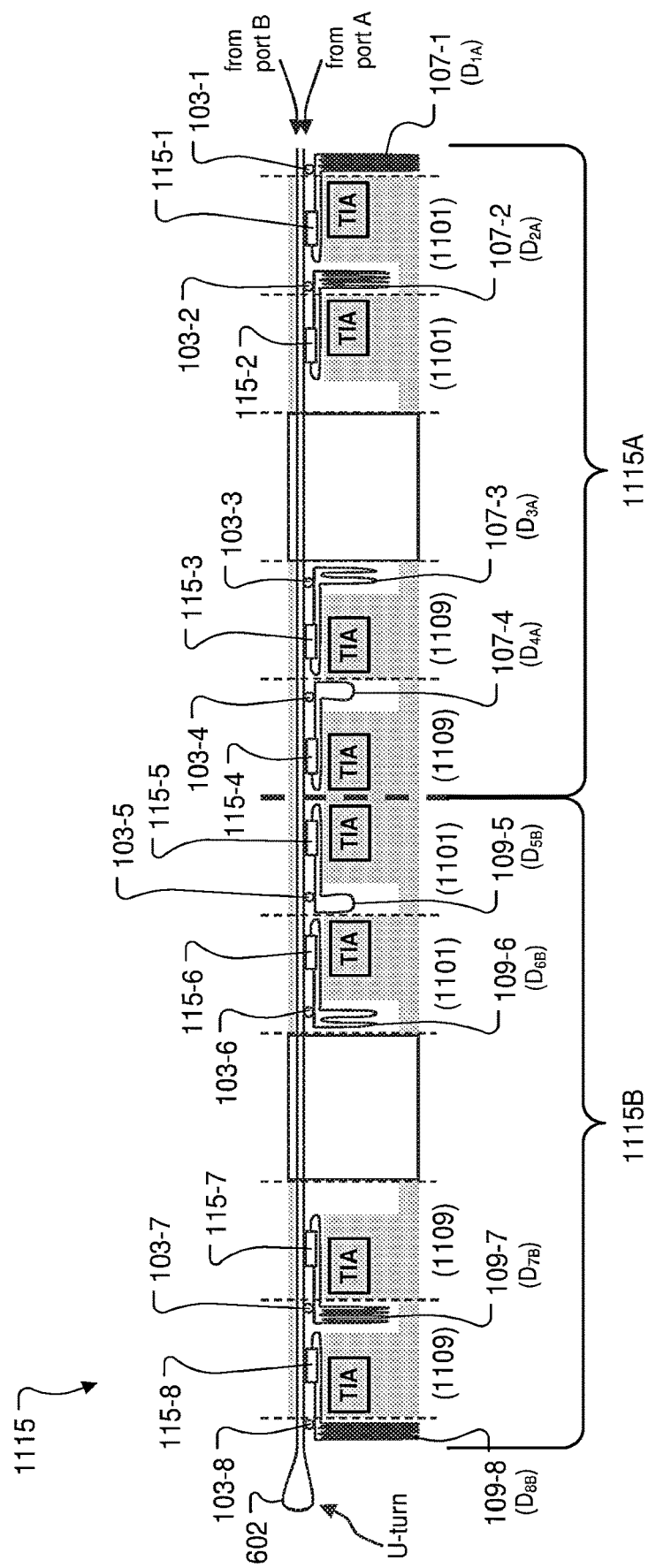
FIG. 11D shows the full WDM receiver row, including the first half of FIG. 11C and a second half implemented as a mirror configuration of the first half, in accordance with some embodiments.

FIG. 11C shows a first half 1115A of a WDM receiver row 1115 implemented using the receiver circuit unit cells 1101 and 1109 of FIGS. 11A and 11B, respectively, in accordance with some embodiments. FIG. 11D shows the full WDM receiver row 1115, including the first half 1115A and a second half 1115B, in accordance with some embodiments. The second half 1115B of the WDM receiver row 1115 is a mirrored version of the first half 1115A of the WDM receiver row 1115 about the midpoint of the WDM receiver row 1115. In some embodiments, it is advantageous for some of the receiver circuit unit cells 1101/1109 in the WDM receiver row 1115 to be reflected with respect to each other. Also, in some embodiments, the optical delay lines (optical waveguides) of the first optical signal timing delay sections 107-1 to 107-N and the second optical signal timing delay sections 109-1 to 109-N are positioned toward the outside of the WDM receiver row 1115. Also, in some embodiments, the optical delay lines (optical waveguides) of the outermost first optical signal timing delay section 107-1 and the outermost second optical signal timing delay section 109-N are positioned outside of the full WDM receiver row 1115. In some embodiments, the TIA circuitry is positioned more toward an outer edge of the receiver circuit unit cell 1101/1109.

In some embodiments of the WDM receiver row 1115, each ring resonator 103-1 to 103-N of the WDM demultiplexers 601-1 to 601-N, respectively, is positioned closer to the outside of the WDM receiver row 1115 relative to the corresponding photodetector 115-1 to 115-N, respectively, to which it is connected. Also, in some embodiments of the WDM receiver row 1115, each first optical signal timing delay section 107-1 to 107-N of the WDM demultiplexers 601-1 to 601-N, respectively, is positioned (when present) closer to the outside of the WDM receiver row 1115 relative to the corresponding photodetector 115-1 to 115-N, respectively, to which it is connected. Also, in some embodiments of the WDM receiver row 1115, one or more of the first optical signal timing delay sections 107-1 to 107-N is placed outside of the receiver circuit unit cell 1101/1109 to which it is connected. Also, in some embodiments of the WDM receiver row 1115, each second optical signal timing delay section 109-1 to 109-N of the WDM demultiplexers 601-1 to 601-N, respectively, is positioned (when present) closer to the outside of the WDM receiver row 1115 relative to the corresponding photodetector 115-1 to 115-N, respectively, to which it is connected. Also, in some embodiments of the WDM receiver row 1115, one or more of the second optical signal timing delay sections 109-1 to 109-N is placed outside of the receiver circuit unit cell 1101/1109 to which it is connected. In various embodiments, symmetry of the photonics components within the WDM receiver row 1115 is different from the symmetry of the receiver circuit unit cells 1101/1109 within the WDM receiver row 1115. However, in various embodiments of the WDM receiver row 1115, the photonics components are configured as a row of cells with similar elements and functions.

Figure 12:
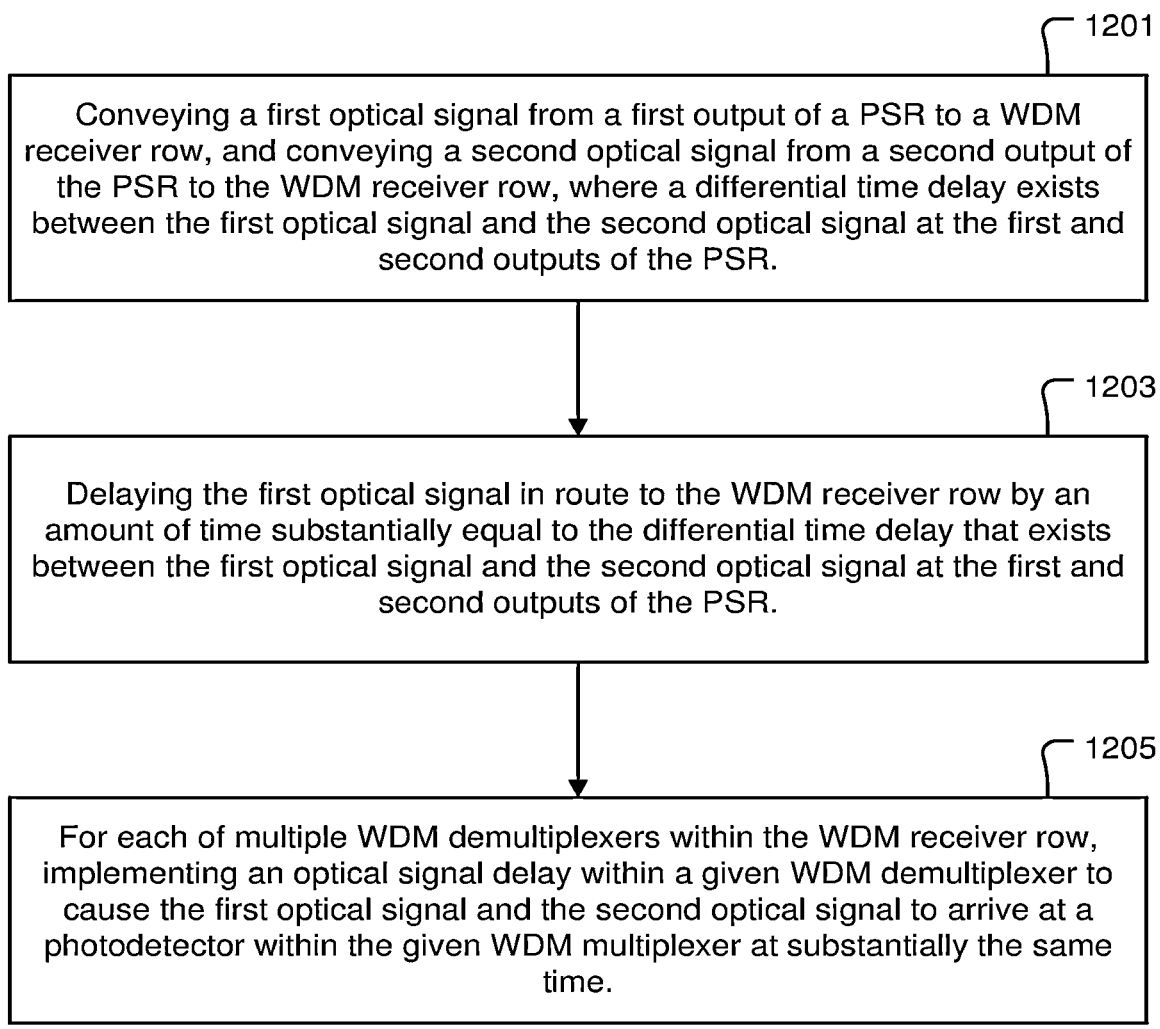
FIG. 12 shows a flowchart of a method for operating a WDM receiver row, in accordance with some embodiments.

FIG. 12 shows a flowchart of a method for operating a WDM receiver row, in accordance with some embodiments. The method includes an operation 1201 in which a first optical signal is conveyed from a first output of a PSR to the WDM receiver row, and in which a second optical signal is conveyed from a second output of the PSR to the WDM receiver row, where a differential time delay ($\tau_{AB}$) exists between the first optical signal and the second optical signal at the first and second outputs of the PSR. The method also includes an operation 1203 for delaying the first optical signal in route to the WDM receiver row by an amount of time ($D_A$) substantially equal to the differential time delay ($\tau_{AB}$) that exists between the first optical signal and the second optical signal at the first and second outputs of the PSR. The method also includes an operation 1205 for implementing an optical signal delay ($\Delta D_k$) within a given WDM demultiplexer (601-$k$) to cause the first optical signal and the second optical signal to arrive at a photodetector (115-$k$) within the given WDM multiplexer (601-$k$) at substantially the same time. The operation 1205 is performed for each of multiple (N) WDM demultiplexers 601-1 to 601-N within the WDM receiver row. It should be understood that any of the principles and concepts described herein with regard to the WDM receiver rows 313, 600, 700, 900, 950, 1001, 115 are applicable for use in conjunction with the method of FIG. 12. Also, it should be understood that any of the principles and concepts described herein with regard to the WDM demultiplexer 100 of FIGS. 1A-1E and 2 are applicable for use in conjunction with the method of FIG. 12.

In some embodiments, an electro-optic receiver is disclosed to include an optical waveguide, e.g., 602, and a plurality of WDM demultiplexers, e.g., 601-1 to 601-N, disposed along the optical waveguide. Each WDM demultiplexer of the plurality of WDM demultiplexers is configured to in-couple optical signals of a respective one of a plurality of wavelengths that travel through the optical waveguide in a first direction as first in-coupled optical signals. Each WDM demultiplexer of the plurality of WDM demultiplexers is also configured to in-couple optical signals of the respective one of the plurality of wavelengths that travel the optical waveguide in a second direction as second in-coupled optical signals, where the second direction is opposite of the first direction. Each WDM demultiplexer of the plurality of WDM demultiplexers is also configured to direct the first in-coupled optical signals to a first photodetector, e.g., 115-1 to 115-N, and to direct the second in-coupled optical signals to a second photodetector, e.g., 115-1 to 115-N. In some embodiments, the first photodetector is a first portion of a photodetector, and the second photodetector is a second portion of the same photodetector. In some embodiments, the first photodetector and the second photodetector are implemented separate from each other.

In some embodiments, each WDM demultiplexer of the plurality of WDM demultiplexers is configured to implement an optical signal timing delay section, e.g., 107-$x$/109-$x$ where x is 1 to N, configured to ensure that both the first in-coupled optical signals that correspond to a given incoming optical signal and the second in-coupled optical signals that also correspond to the given incoming optical signal respectively arrive at the first photodetector and the second photodetector at substantially a same time. An amount of temporal delay imparted by the optical signal timing delay section of a given WDM demultiplexer of the plurality of WDM demultiplexers is dependent upon a location of the given WDM demultiplexer along the optical waveguide.

In some embodiments, the plurality of WDM demultiplexers includes a first sequentially positioned half of the plurality of WDM demultiplexers, e.g., 601-1 to 601-(N/2), relative to the first end of the optical waveguide and a second sequentially positioned half of the plurality of WDM demultiplexers, e.g., 601-[(N/2)+1] to 601-N, relative to the first end of the optical waveguide. The first sequentially positioned half of the plurality of WDM demultiplexers implements the optical signal timing delay section, e.g., 107-1 to 107-(N/2), to delay the first in-coupled optical signals before reaching the first photodetector. The second sequentially positioned half of the plurality of WDM demultiplexers implements the optical signal timing delay section, e.g., 109-[(N/2)+1] to 109-N, to delay the second in-coupled optical signals before reaching the second photodetector. In some embodiments, the amounts of temporal delay imparted by the optical signal timing delay sections within the first sequentially positioned half of the plurality of WDM demultiplexers and the amounts of temporal delay imparted by the optical signal timing delay sections within the second sequentially positioned half of the plurality of WDM demultiplexers are mirrored relative to a midpoint location between the first sequentially positioned half of the plurality of WDM demultiplexers and the second sequentially positioned half of the plurality of WDM demultiplexers. In some embodiments, the amounts of temporal delay imparted by the optical signal timing delay sections, e.g., 107-1 to 107-(N/2), within the first sequentially positioned half of the plurality of WDM demultiplexers increase with increased distance of the corresponding WDM demultiplexer from the midpoint location between the first sequentially positioned half of the plurality of WDM demultiplexers and the second sequentially positioned half of the plurality of WDM demultiplexers. Also, in some embodiments, the amounts of temporal delay imparted by the optical signal timing delay sections, e.g., 109-[(N/2)+1] to 109-N, within the second sequentially positioned half of the plurality of WDM demultiplexers increase with increased distance of the corresponding WDM demultiplexer from the midpoint location between the first sequentially positioned half of the plurality of WDM demultiplexers and the second sequentially positioned half of the plurality of WDM demultiplexers.

The foregoing description of the embodiments has been provided for purposes of illustration and description, and is not intended to be exhaustive or limiting. Individual elements or features of a particular embodiment are generally not limited to that particular embodiment, but, where applicable, are interchangeable and can be used in a selected embodiment, even if not specifically shown or described. In this manner, one or more features from one or more embodiments disclosed herein can be combined with one or more features from one or more other embodiments disclosed herein to form another embodiment that is not explicitly disclosed herein, but rather that is implicitly disclosed herein. This other embodiment may also be varied in many ways. Such embodiment variations are not to be regarded as a departure from the disclosure herein, and all such embodiment variations and modifications are intended to be included within the scope of the disclosure provided herein.

Although some method operations may be described in a specific order herein, it should be understood that other housekeeping operations may be performed in between method operations, and/or method operations may be adjusted so that they occur at slightly different times or simultaneously or may be distributed in a system which allows the occurrence of the processing operations at various intervals associated with the processing, as long as the processing of the method operations are performed in a manner that provides for successful implementation of the method.

Although the foregoing embodiments have been described in some detail for purposes of clarity of understanding, it will be apparent that certain changes and modifications can be practiced within the scope of the appended claims. Accordingly, the embodiments disclosed herein are to be considered as illustrative and not restrictive, and are therefore not to be limited to just the details given herein, but may be modified within the scope and equivalents of the appended claims.

What is claimed is:

1. An electro-optic receiver, comprising:
    a first optical waveguide optically connected to convey a first portion of incoming light in a first direction through the first optical waveguide, the first optical waveguide also optically connected to convey a second portion of incoming light in a second direction through the first optical waveguide, the second direction being opposite of the first direction;
    a ring resonator disposed within an evanescent optical coupling distance of the first optical waveguide, such that the first portion of incoming light and the second portion of incoming light couple into the ring resonator from the first optical waveguide, and such that the first portion of incoming light and the second portion of incoming light travel in opposite directions within the ring resonator;
    a second optical waveguide disposed within an evanescent optically coupling distance of the ring resonator, such that the first portion of incoming light and the second portion of incoming light couple into the second optical waveguide from the ring resonator, and such that the first portion of incoming light and the second portion of incoming light travel in opposite directions within the second optical waveguide away from the ring resonator;
    a photodetector optically connected to both a first end of the second optical waveguide and a second end of the second optical waveguide;
    a first optical signal timing delay section disposed along the second optical waveguide at a location between the ring resonator and the first end of the second optical waveguide, the first optical signal timing delay section configured to impart a controlled amount of temporal delay to a first light signal that travels through the first optical signal timing delay section; and
    a second optical signal timing delay section disposed along the second optical waveguide at a location between the ring resonator and the second end of the second optical waveguide, the second optical signal timing delay section configured to impart a controlled amount of temporal delay to a second light signal that travels through the second optical signal timing delay section.

2. The electro-optic receiver as recited in claim 1, further comprising:
    a heater disposed within the ring resonator, wherein the heater is controllable to in turn control a resonant wavelength of the ring resonator, such that only light within a specified wavelength band around the resonant wavelength is able to couple into and out of the ring resonator.

3. The electro-optic receiver as recited in claim 1, wherein the first optical signal timing delay section is formed as an optical waveguide section.

4. The electro-optic receiver as recited in claim 3, wherein the optical waveguide section includes an input optical waveguide and an output optical waveguide that run side-by-side in one or more of a folded manner, a convoluted manner, a spiral manner, a loop manner, and a zig-zag manner toward a central location, wherein the input optical waveguide and the output optical waveguide are optically connected at the central location.

5. The electro-optic receiver as recited in claim 4, wherein the input optical waveguide and the output optical waveguide are integrally formed as a single optical waveguide structure.

6. The electro-optic receiver as recited in claim 1, wherein the first optical signal timing delay section includes an input optical waveguide, an output optical waveguide, and a resonant device having an input optically connected to the input optical waveguide and having an output optically connected to the output optical waveguide.

7. The electro-optic receiver as recited in claim 6, wherein the input optical waveguide and the output optical waveguide nm side-by-side over a distance to optically connect with the resonant device.

8. The electro-optic receiver as recited in claim 1, wherein the controlled amount of temporal delay imparted by the first optical signal timing delay section is different that the controlled amount of temporal delay imparted by the second optical signal timing delay section.

9. The electro-optic receiver as recited in claim 1, wherein the photodetector is a photodetector configured to separately detect the first light signal that enters a first end of the photodetector from the first end of the second optical waveguide and the second light signal that enters a second end of the photodetector from the second end of the second optical waveguide.

10. The electro-optic receiver as recited in claim 1, further comprising:
    a polarization beam splitter and rotator having an input optically connected to receive incoming light, the polarization beam splitter and rotator configured to direct a first part of the incoming light having a first polarization to a first output of the polarization beam splitter and rotator so as to provide the first portion of incoming light, the polarization beam splitter and rotator configured to direct a second part of the incoming light having a second polarization to a second output of the polarization beam splitter and rotator, the polarization beam splitter and rotator also configured to rotate a polarization of a second part of the incoming light from a second polarization to the first polarization in route to the second output of the polarization beam splitter and rotator so as to provide the second portion of incoming light, wherein a first end of the first optical waveguide is optically connected to the first output of the polarization beam splitter and rotator and a second end of the first optical waveguide is optically connected to the second output of the polarization beam splitter and rotator.

11. The electro-optic receiver as recited in claim 10, further comprising:
    an optical coupling device configured to transfer the incoming light from an optical fiber to the input of the polarization beam splitter and rotator.

12. The electro-optic receiver as recited in claim 10, further comprising:

an optical signal timing delay disposed along the first optical waveguide at a location between the first output of the polarization beam splitter and rotator and the ring resonator.

13. The electro-optic receiver as recited in claim 12, wherein the optical signal timing delay is configured to impart a temporal delay in an arrival time of the first portion of incoming light at the ring resonator, wherein the temporal delay is set so that an arrival time of the second portion of incoming light at the ring resonator is substantially equal to the arrival time of the first portion of incoming light at the ring resonator.

14. The electro-optic receiver as recited in claim 1, further comprising:
   a plurality of wavelength division multiplexing (WDM) demultiplexers disposed along the first optical waveguide, wherein each WDM demultiplexer includes a respective separate instantiation of the ring resonator, a respective separate instantiation of the second optical waveguide, and a respective separate instantiation of the photodetector.

15. The electro-optic receiver as recited in claim 14, wherein each WDM demultiplexer of the plurality of WDM demultiplexers is configured to implement a respective separate instantiation of the first optical signal timing delay section along the respective separate instantiation of the second optical waveguide to ensure that both a respective separate instantiation of the first portion of incoming light and a respective separate instantiation of the second portion of incoming light arrive at the respective separate instantiation of the photodetector at substantially a same time.

16. The electro-optic receiver as recited in claim 15, wherein an amount of temporal delay imparted by the respective separate instantiation of the first optical signal timing delay section of a given WDM demultiplexer of the plurality of WDM demultiplexers is dependent upon a location of the given WDM demultiplexer along the first optical waveguide.

17. The electro-optic receiver as recited in claim 15, wherein the plurality of WDM demultiplexers includes a first sequentially positioned half of the plurality of WDM demultiplexers relative to a first end of the first optical waveguide and a second sequentially positioned half of the plurality of WDM demultiplexers relative to the first end of the first optical waveguide, wherein the first sequentially positioned half of the plurality of WDM demultiplexers implements the respective separate instantiations of the first optical signal timing delay section to delay the respective separate instantiations of the first portion of incoming light before reaching the respective separate instantiations of the photodetector, and wherein the second sequentially positioned half of the plurality of WDM demultiplexers implements a respective separate instantiation of the second optical signal timing delay section to delay the respective separate instantiation of the second portion of incoming light before reaching the respective separate instantiation of the photodetector to ensure that both the respective separate instantiation of the first portion of incoming light and the respective separate instantiation of the second portion of incoming light arrive at the respective separate instantiation of the photodetector at substantially a same time.

18. The electro-optic receiver as recited in claim 17, wherein amounts of temporal delay imparted by the respective separate instantiations of the first optical signal timing delay sections within the first sequentially positioned half of the plurality of WDM demultiplexers and amounts of temporal delay imparted by the respective separate instantiations of the second optical signal timing delay sections within the second sequentially positioned half of the plurality of WDM demultiplexers are mirrored relative to a midpoint location between the first sequentially positioned half of the plurality of WDM demultiplexers and the second sequentially positioned half of the plurality of WDM demultiplexers.

19. The electro-optic receiver as recited in claim 17, wherein amounts of temporal delay imparted by the respective separate instantiations of the first optical signal timing delay sections within the first sequentially positioned half of the plurality of WDM demultiplexers increase with increased distance of the corresponding WDM demultiplexer from the midpoint location, and wherein amounts of temporal delay imparted by the respective separate instantiations of the second optical signal timing delay sections within the second sequentially positioned half of the plurality of WDM demultiplexers increase with increased distance of the corresponding WDM demultiplexer from the midpoint location.

20. The electro-optic receiver as recited in claim 17, wherein each of the respective separate instantiations of the first optical signal timing delay section is formed as a respective separate instantiation of an optical waveguide section, and wherein each of the respective separate instantiations of the second optical signal timing delay section is formed as a respective separate instantiation of an optical waveguide section.

21. The electro-optic receiver as recited in claim 14, wherein each of the respective separate instantiations of the photodetector is configured to separately detect light that enters a first end of the respective separate instantiation of the photodetector from the first end of the respective separate instantiations of the second optical waveguide and light that enters a second end of the respective separate instantiation of the photodetector from the second end of the respective separate instantiation of the second optical waveguide.

* * * * *